US011465782B2

(12) United States Patent
Ealy et al.

(10) Patent No.: US 11,465,782 B2
(45) Date of Patent: Oct. 11, 2022

(54) SYSTEMS AND METHODS FOR AUTONOMOUS DEORBITING OF A SPACECRAFT

(71) Applicant: The Boeing Company, Chicago, IL (US)

(72) Inventors: John P. Ealy, Long Beach, CA (US); Brian A. Phail, Artesia, CA (US); Dave Poladian, Glendale, CA (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 16/553,206

(22) Filed: Aug. 28, 2019

(65) Prior Publication Data
US 2021/0061497 A1     Mar. 4, 2021

(51) Int. Cl.
*B64G 1/24*     (2006.01)
*B64G 1/26*     (2006.01)
*G05D 1/04*     (2006.01)

(52) U.S. Cl.
CPC ............ *B64G 1/242* (2013.01); *B64G 1/24* (2013.01); *B64G 1/26* (2013.01); *G05D 1/04* (2013.01); *B64G 2001/247* (2013.01)

(58) Field of Classification Search
CPC .......... B64G 1/122; B64G 1/242; B64G 1/24; B64G 1/26; B64G 1/62; B64G 1/36; B64G 2001/247; G05D 1/04; G01C 23/00

(Continued)

(56) References Cited

U.S. PATENT DOCUMENTS

| 5,064,151 A * | 11/1991 | Cerimele | B64G 1/62 244/172.1 |
| 2011/0264312 A1* | 10/2011 | Spinelli | G08G 5/0056 701/16 |
| 2014/0136029 A1* | 5/2014 | Nagase | B64G 1/242 701/3 |

FOREIGN PATENT DOCUMENTS

| CN | 108 674 695 A | 10/2018 |
| EP | 2 733 075 A1 | 5/2014 |
| EP | 3 506 041 A1 | 7/2019 |

OTHER PUBLICATIONS

"MorganBaldwin, OptimalDeorbitGuidance, 2012" (Year: 2012).*
(Continued)

*Primary Examiner* — Khoi H Tran
*Assistant Examiner* — Sarah A Tran
(74) *Attorney, Agent, or Firm* — McDonnell Boehnen Hulbert & Berghoff LLP

(57) ABSTRACT

In an example, a method for deorbiting a spacecraft is described. The method includes selecting a target landing site for deorbiting the spacecraft. The method includes determining a range target and a velocity target for reaching a predicted atmospheric entry location. The method includes determining a back-propagated orbit state estimate of the spacecraft. The method includes comparing the back-propagated orbit state estimate to a known orbit state of the spacecraft to determine that the back-propagated orbit state estimate has converged with the known orbit state. The method includes calculating based on determining that the back-propagated orbit state estimate has converged with the known orbit state, (a) an estimated time of ignition for a propulsion system of the spacecraft and (b) an estimated burn velocity vector of the propulsion system using the range target and the velocity target. The method includes performing a burn pulse by the propulsion system.

20 Claims, 18 Drawing Sheets

(58) Field of Classification Search
USPC .......................................................... 701/13
See application file for complete search history.

(56) References Cited

OTHER PUBLICATIONS

"Paschall, A Self Contained Method for Safe & Precise Lunar Landing, 2008, IEEE" (Year: 2008).*
Morgan C. Baldwin, et al., "Optimal Deorbit Guidance", Journal of Guidance and Control and Dynamics, vol. 35, No. 1, Jan. 1, 2012, pp. 93-103.
Zheng Chen et al., "Controllability of Keplerian Motion with Low-Thrust Control Systems," arxiv. org., Cornell University Library, May 27, 2015.
Extended European Search Report prepared by the European Patent Office in application No. EP 20 18 1873.9 dated Nov. 23, 2020.

* cited by examiner

SYSTEMS AND METHODS FOR AUTONOMOUS DEORBITING OF A SPACECRAFT

STATEMENT REGARDING FEDERALLY SPONSORED RESEARCH OR DEVELOPMENT

This invention was made with Government support under contract number NNK14MA75C awarded by NASA. The government has certain rights in this invention.

FIELD

The present disclosure relates generally to deorbiting a spacecraft. In particular, the present disclosure relates to using on-board sensors and computing systems to deorbit the spacecraft.

BACKGROUND

A spacecraft orbiting a celestial body, such as a planet, may ideally deorbit within a particular time window. The time window may be associated with the end of a mission, an operational status of the spacecraft, or a desired landing site. Selecting a landing site and calculating an efficient and feasible deorbit path for the spacecraft requires consideration of several factors. Accordingly, carrying out these functions within the time window may present difficulties.

Existing systems and methods for deorbiting spacecraft involve ground-side systems and two-way communication between the spacecraft and a ground-based system to provide on-board sensor information to the ground-based system and to receive instructions from the ground-based system. Latency in these communications, transmission errors, and other factors may increase the time needed to calculate deorbit burn targets for the spacecraft and reduce confidence in the resulting burn instructions.

What is needed is an autonomous on-board system of a spacecraft for land site selection and deorbit targeting.

SUMMARY

In an example, a method of deorbiting a spacecraft is described. The method comprises selecting, by a computing device of the spacecraft, a target landing site for deorbiting the spacecraft. The method comprises, during a predetermined time window associated with deorbiting the spacecraft: (i) determining, by the computing device, a range target and a velocity target for reaching a predicted atmospheric entry location, wherein the predicted atmospheric entry location corresponds to a point at which the spacecraft interacts with an atmosphere in order to reach the target landing site, (ii) determining, by the computing device, a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target, (iii) comparing, by the computing device, the back-propagated orbit state estimate to a known orbit state of the spacecraft to determine that the back-propagated orbit state estimate has converged with the known orbit state, and (iv) calculating, by the computing device, based on determining that the back-propagated orbit state estimate has converged with the known orbit state, (a) an estimated time of ignition for a propulsion system of the spacecraft and (b) an estimated burn velocity vector of the propulsion system using the range target and the velocity target. The method comprises, at or prior to an end time of the predetermined time window, performing a burn pulse by the propulsion system in accordance with the estimated time of ignition and the estimated burn velocity vector.

In another example, a system for deorbiting a spacecraft is described. The system comprises a spacecraft. The spacecraft comprises a computing device having a processor and memory storing instructions executable by the processor. The instructions are executable by the processor to select a target landing site for deorbiting the spacecraft. The instructions are executable by the processor to, during a predetermined time window associated with deorbiting the spacecraft: (i) determine a range target and a velocity target for reaching a predicted atmospheric entry location, wherein the predicted atmospheric entry location corresponds to a point at which the spacecraft interacts with an atmosphere in order to reach the target landing site, (ii) determine, a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target, (iii) compare the back-propagated orbit state estimate to a known orbit state of the spacecraft to determine that the back-propagated orbit state estimate has converged with the known orbit state, and (iv) calculate based on determining that the back-propagated orbit state estimate has converged with the known orbit state, (a) an estimated time of ignition for a propulsion system of the spacecraft and (b) an estimated burn velocity vector of the propulsion system using the range target and the velocity target. The system further comprises the propulsion system configured to, at or prior to an end time of the predetermined time window, perform a burn pulse in accordance with the estimated time of ignition and the estimated burn velocity vector.

In another example, a non-transitory computer readable medium having stored thereon instructions, that when executed by one or more processors of a computing device, cause the computing device to perform functions is described. The functions comprise selecting a target landing site for deorbiting a spacecraft. The functions further comprise, during a predetermined time window associated with deorbiting the spacecraft: (i) determining a range target and a velocity target for reaching a predicted atmospheric entry location, wherein the predicted atmospheric entry location corresponds to a point at which the spacecraft interacts with an atmosphere in order to reach the target landing site, (ii) determining a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target, (iii) comparing the back-propagated orbit state estimate to a known orbit state of the spacecraft to determine that the back-propagated orbit state estimate has converged with the known orbit state, and (iv) calculating based on determining that the back-propagated orbit state estimate has converged with the known orbit state, (a) an estimated time of ignition for a propulsion system of the spacecraft and (b) an estimated burn velocity vector of the propulsion system using the range target and the velocity target. The functions comprise at or prior to an end time of the predetermined time window, performing a burn pulse by the propulsion system in accordance with the estimated time of ignition and the estimated burn velocity vector.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
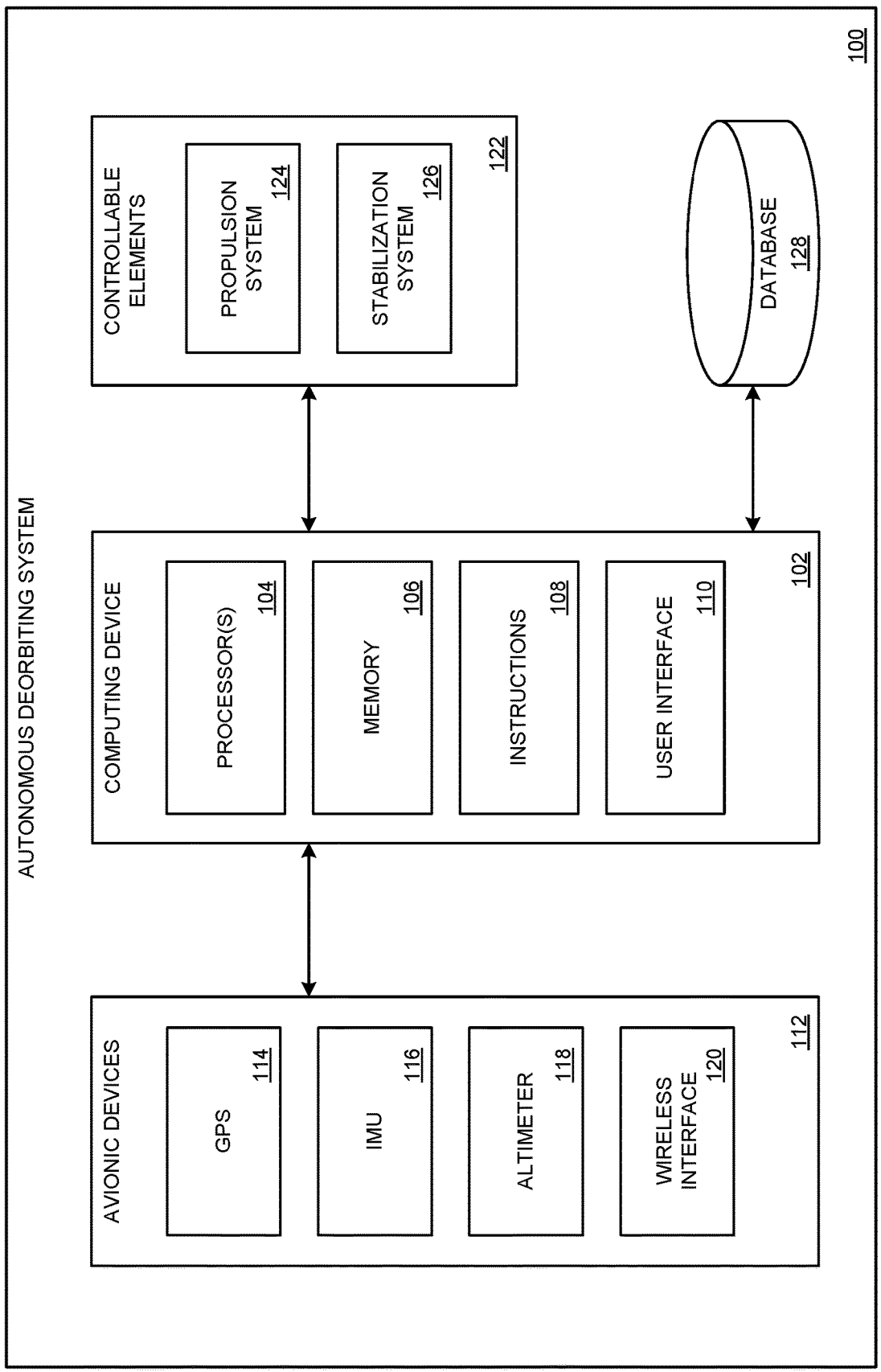
FIG. 1 illustrates a block diagram of a system for deorbiting a spacecraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for deorbiting a spacecraft are described. In particular, systems and method for deorbiting a spacecraft autonomously with on-board sensors and systems.

Example systems and methods involve autonomously selecting a land site for targeting while deorbiting the spacecraft. Selecting the land site may involve receiving a user input that includes an indication of a time window for deorbiting the spacecraft. During the time window, a computing device of the spacecraft may evaluate known ground sites to select a site that is reachable by the spacecraft given an orbit state of the spacecraft and other factors, such as a rotation of the celestial body and atmospheric qualities of the celestial body. The computing system may select a target landing site from among reachable ground locations, and, if no ground locations are available, may determine a reachable water site for landing. In this manner, the spacecraft can autonomously select a landing site in a robust manner that falls within a selected time window. For purposes of this disclosure, performing functions autonomously may refer to carrying out the functions programmatically based on sensor data, stored information, machine learning techniques, or the like, without user input and/or instructions. Within this context, functions may still be referred to as autonomous if they are prompted at some point by user actions. For example, a user may trigger the spacecraft to autonomously deorbit by selecting a time window for deorbiting the spacecraft.

Example systems a methods involve using on-board sensors of a spacecraft to determine characteristics of the spacecraft and the environment that are relevant to calculating a burn pulse for guiding the spacecraft to the selected landing site. A computing device uses sensor data from the sensors to determine the burn pulse and to deorbit the spacecraft. To facilitate this, a computing device may use known qualities associated with the celestial body and an expected trajectory of the spacecraft to determine an atmospheric entry location, and can iteratively back-propagate from the atmospheric entry location to determine whether a range target and velocity target for reaching the atmospheric entry location converges with the known orbit state of the spacecraft. A burn pulse can be determined based on a range target and velocity target that converges with a known state, such as a current state, of the spacecraft. Making these calculations on-board the spacecraft allows these calculations to be performed in real time or near real time. In this manner, the spacecraft can autonomously determine a burn solution for deorbiting the spacecraft that is accurate and robust, and in a manner that allows for increased confidence in the determined burn solution.

For purposes of this disclosure, a burn solution refers to one or more controlled aspects of deorbiting the spacecraft using one or more thrusters, including but not limited to a time of ignition for performing a burn pulse from the one or more thrusters and a burn velocity vector associated with the burn pulse. The burn velocity vector may generally relate to a change in velocity (i.e. a change in speed and/or direction) of the spacecraft resulting from the burn pulse, and more particularly to a duration of the burn pulse and forces associated with operating the one or more thrusters.

Turning now to the figures, FIG. 1 illustrates a block diagram of a system 100 for deorbiting a spacecraft, according to an example implementation. In particular, FIG. 1 shows an autonomous deorbiting system that can be implemented on-board a spacecraft. The system includes a computing device 102. The system 100 may include one or more computing devices, such as a spacecraft controller, a spacecraft navigation system, or a combination of submodules within a spacecraft.

The computing device 102 includes one or more processor(s) 104, a memory 106, instructions 108, and a user interface 110. The one or more processor(s) 104 may be general-purpose processors or special purpose processors (e.g., digital signal processors, application specific integrated circuits, etc.). The one or more processor(s) 104 can be configured to execute the instructions 108 (e.g., computer-readable program instructions) that are stored in the memory 106 and are executable to provide the functionality of computing device 102, and related systems and methods described herein.

The memory 106 may include or take the form of one or more computer-readable storage media that can be read or accessed by the processor(s) 104. The computer-readable storage media can include volatile and/or non-volatile storage components, such as optical, magnetic, organic or other memory or disc storage, which can be integrated in whole or in part with the processor(s) 104. The memory 106 is considered non-transitory computer readable media. In some examples, the memory 106 can be implemented using a single physical device (e.g., one optical, magnetic, organic or other memory or disc storage unit), while in other examples, the memory 106 can be implemented using two or more physical devices. The memory 106 thus is a non-transitory computer readable storage medium, and instructions 108 executable by the processor(s) 104 are stored on the memory 106. The instructions 108 include computer executable code.

The user interface 110 may include or take the form of a keyboard, a mouse, a touchscreen, a microphone, a gesture recognition system, a combination thereof, or another means of receiving user input by the computing device 102. The user interface can be integrated into the computing device 102 as depicted in FIG. 1 or be included in another subsystem or device.

The system 100 further includes a plurality of avionic devices 112. The avionic devices 112 include a Global Positioning System (GPS) 114, an inertial measurement unit (IMU) 116, an altimeter 118, and a wireless interface 120.

The avionic devices 112 may include more or fewer sensors and devices, or may include alternative sensors providing similar functionality to those depicted in FIG. 1. The avionic devices 112 may be collectively configured to obtain sensor data includes information indicative of an orbit state of the spacecraft, including a location of the spacecraft, a trajectory of the spacecraft, and an altitude of the spacecraft. The computing device 102 may use this information to identify a target landing site, and to calculate a burn solution for deorbiting the spacecraft. Example implementations for determining the burn solution using this information are described below.

The system 100 further includes a plurality of controllable elements 122 of the spacecraft. The controllable elements 122 include a propulsion system 124 and a stabilization system 126. The propulsion system 124 and the stabilization system 126 can be controlled by the computing device 102 to guide the spacecraft to the target landing site. In particular, one or both of the propulsion system 124 and stabilization system 126 includes one or more thrusters that emit a burn pulse to direct movement of the spacecraft.

The system 100 further includes a database 128. The database 128 may be remote to the spacecraft or on-board the spacecraft, and may include information relevant for use in deorbiting the spacecraft. For example, the database 128 may include a data store that has representations of preferred landing sites on the celestial body. Thus, the database 128 may be a database of ground location, such as target ground locations, and/or water locations. The representations can include representations of locations and elevations of the target landing sites, and include priority levels associated with each site. The database 128 may further include a store of known characteristics of various spacecraft systems such as propulsion systems (e.g. the propulsion system 124). Thus, the database 128 may be a database of propulsion systems characteristics. The database 128 may further include a data store having representations of known characteristics of an environment of the celestial body. For example, the data store may include representations of an altitude at which objects enter an atmosphere of the celestial body (e.g. a Karman line), and other atmospheric characteristics. Thus, the database 128 may be a database of known atmospheric forces. The data store may further include indications of past burn solution calculations and sensor data. Such data can be associated with a trained machine learning model used for determining burn solutions for deorbiting the spacecraft.

Further illustrative examples of how the system 100 deorbits the spacecraft are provided below.

Figure 2:
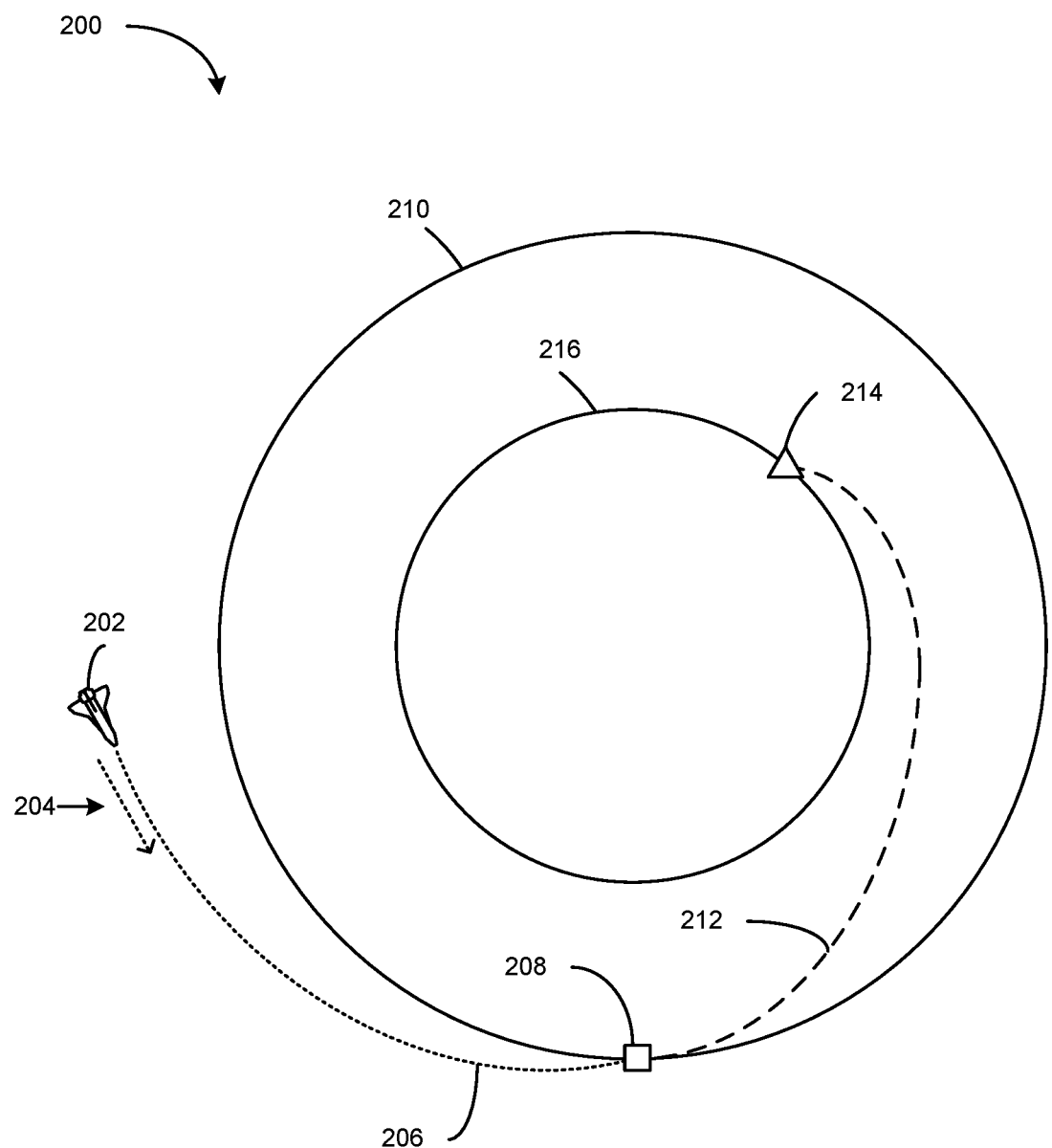
FIG. 2 illustrates an example deorbit path of a spacecraft, according to an example implementation.

FIG. 2 illustrates an example deorbit path of a spacecraft 202, according to an example implementation. In particular, FIG. 2 shows a system 200 in accordance with an example scenario. The system 200 includes the spacecraft 202 having an orbit state 204, and a celestial body 216 having an atmosphere 210. The orbit state 204 is represented as a trajectory in FIG. 2. However, within examples, the orbit state may include additional information of the spacecraft 202, such as an altitude of the spacecraft 202. The celestial body 216 may be a planet, such as Earth, or another celestial body.

In the present example, an atmospheric entry location 208 is depicted on a Karman line of the atmosphere 210. Within examples, a different interpretation of atmospheric entry can be used. The spacecraft 202 follows a first path 206 from the location depicted in FIG. 2 in accordance with the orbit state 204, an altitude of the spacecraft 202, and gravitational forces experienced by the spacecraft 202. The spacecraft 202 follows a second path 212 from the atmospheric entry location 208 to a target landing site 214. Though FIG. 2 is provided in accordance with an example scenario, the following figures may be described in relation to the present example scenario for purposes of illustration.

Figure 3:
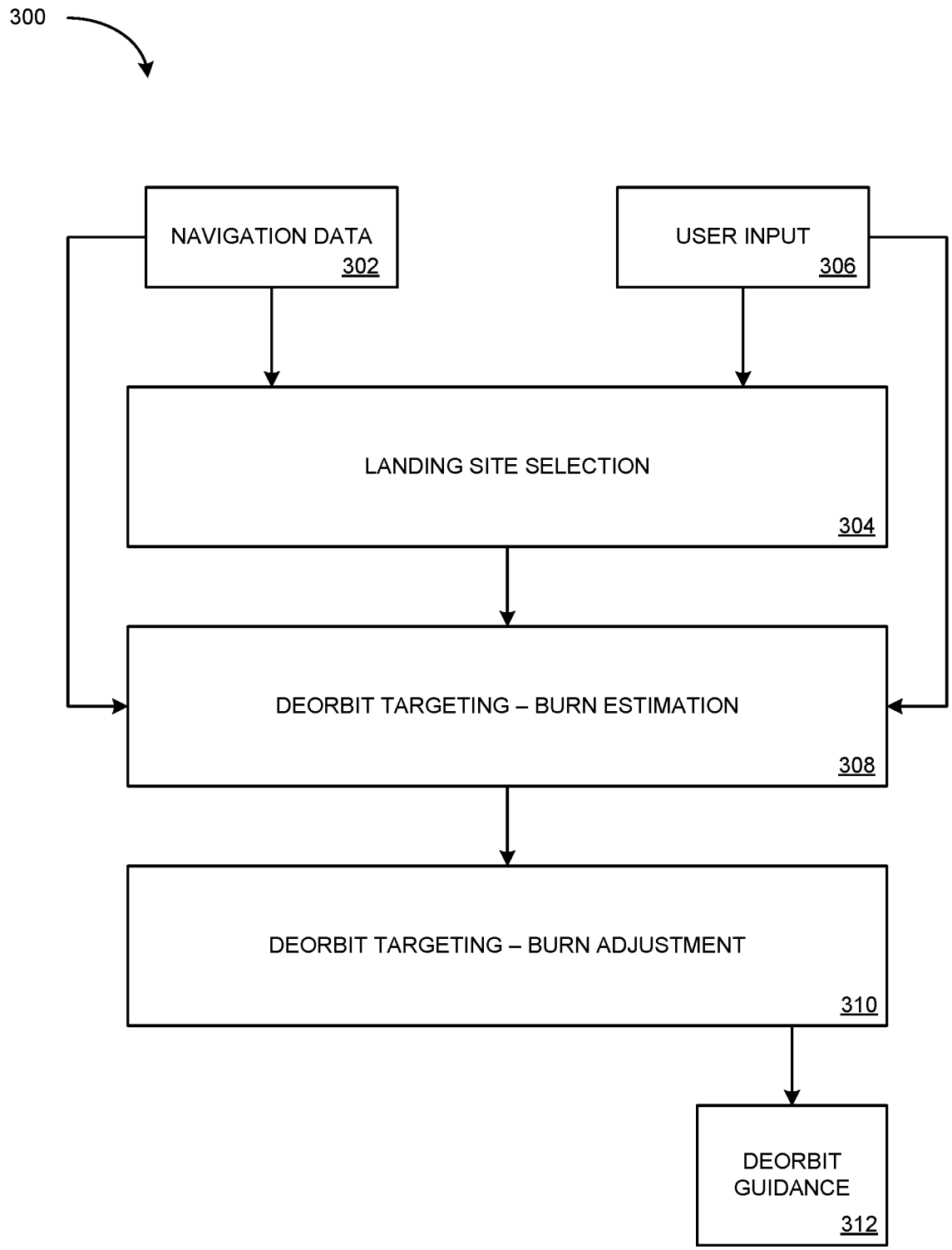
FIG. 3 illustrates a flowchart of a method for deorbiting a spacecraft, according to an example implementation.

FIG. 3 illustrates a flowchart of a method 300 for deorbiting the spacecraft 202, according to an example implementation. The flowchart includes a series of blocks, including blocks 302, 304, 306, 308, 310, and 312. Each block relates to an aspect of deorbiting the spacecraft 202, and can be implemented using components of systems 100 or 200 shown in FIGS. 1 and 2, or in conjunction with a spacecraft, such as the spacecraft 202 depicted in FIG. 2, for example. For example, the computing device 102 may be configured to carry out the method 300. The blocks represent modules, subcomponents, or steps that relate to deorbiting the spacecraft 202. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes obtaining navigation data including sensor data indicative of a location of the spacecraft 202, the orbit state 204 of the spacecraft 202, and an altitude of the spacecraft 202. For example, this navigation information may be obtained using one or more of the avionic devices 112.

At block 304, the method 300 for landing site selection as a part of deorbiting a spacecraft and includes determining one or more ground locations that are reachable from a current location of the spacecraft 202 given the orbit state of the spacecraft 202 as determined in block 302. Determining the one or more ground locations is described in further detail below with respect to FIG. 4B. A target landing site may be selected from the plurality of ground locations based on a period of time associated with reaching the target landing site. For example, the landing site can be the target landing site 214 depicted in FIG. 2. Further details relating to block 304 are provided below with respect to FIG. 4A.

At block 306, the method 300 includes receiving a user input by way of the user interface 110 that indicates a selected time window. The time window may be associated with deorbiting the spacecraft 202. For example, the time window may specify a first time that starts at or after a current time and a second time that is later than the first time. The time window may correspond to a time frame during which one or more thrusters of the spacecraft is to be controlled to perform a burn pulse that causes the spacecraft 202 to deorbit and follow a path that leads to a selected target landing site. Further, the user input may include information about one or more of the propulsion system 124 and the stabilization system 126. For example, the information may specify a type of propulsion system or a type of stabilization system of the spacecraft 202, which may be associated with a level of thrust from one or more thrusters used for deorbiting the spacecraft 202. In this manner, a user may provide some parameters for deorbiting the spacecraft 202 and on-board sensors and computing devices may responsively determine and perform a burn pulse to deorbit the spacecraft 202.

The method 300 further includes a block 308 for performing a burn estimation aspect of deorbit targeting used as a part of deorbiting a spacecraft. The burn estimation aspect of deorbit targeting involves determining a predicted atmospheric entry location in view of determining the target landing site 214 and estimating a burn solution in view of the predicted atmospheric entry location. For example, a range target and a velocity target for reaching the predicted atmospheric entry location are calculated. Within examples, this can be performed based on a forward-propagated prediction of an atmospheric entry point determined using the target landing site 214, a current trajectory of the spacecraft 202, and known characteristics of the atmosphere 210 and the spacecraft 202. For example, the range target and velocity target may correspond to the spacecraft reaching the predicted atmospheric entry location within constraints defined by expected forces resulting from interaction between the atmosphere 210 and the spacecraft 202. Further, block 308 includes determining a back-propagated orbit state estimate of the spacecraft 202 from the predicted atmospheric entry location using the range target and the velocity target. Further details relating to back-propagation are provided below with respect to FIG. 5A. If the back-propagated orbit state corresponds closely with an actual orbit state of the spacecraft 202, this is indicative of a corresponding burn solution being feasible. Thus, block 308 includes determining whether the back-propagated orbit state has converged with a known orbit state of the spacecraft 202. Further details relating to convergence are provided below with respect to FIG. 5A. If there is a convergence, a burn solution, such as an ignition time and a velocity vector, may be estimated for a burn pulse based on the predicted atmospheric entry location.

The method 300 further includes a block 310 for performing a burn adjustment aspect of deorbit targeting used as a part of deorbiting a spacecraft. The burn adjustment aspect of deorbit targeting involves calculating an actual burn solution for deorbiting the spacecraft. The actual burn solution corresponds to a burn pulse executed by one or more thrusters of, for example, the propulsion system 124. Block 310 involves taking additional factors, such as a higher order gravitation models, into account for purposes of altering the burn solution determined at block 308 to converge on the actual burn solution. Further details of block 310 are provided below.

The method 300 further includes a block 312 for deorbit guidance as a part of deorbiting a spacecraft in which continuous error checks and adjustments are made during deorbiting. For example, the stabilization system 126 may be controlled during deorbiting to maintain an orientation of the spacecraft 202 relative to a ground surface of the celestial body 216 during deorbiting. Aspects of the method 300 are now described in further detail.

Figure 4A:
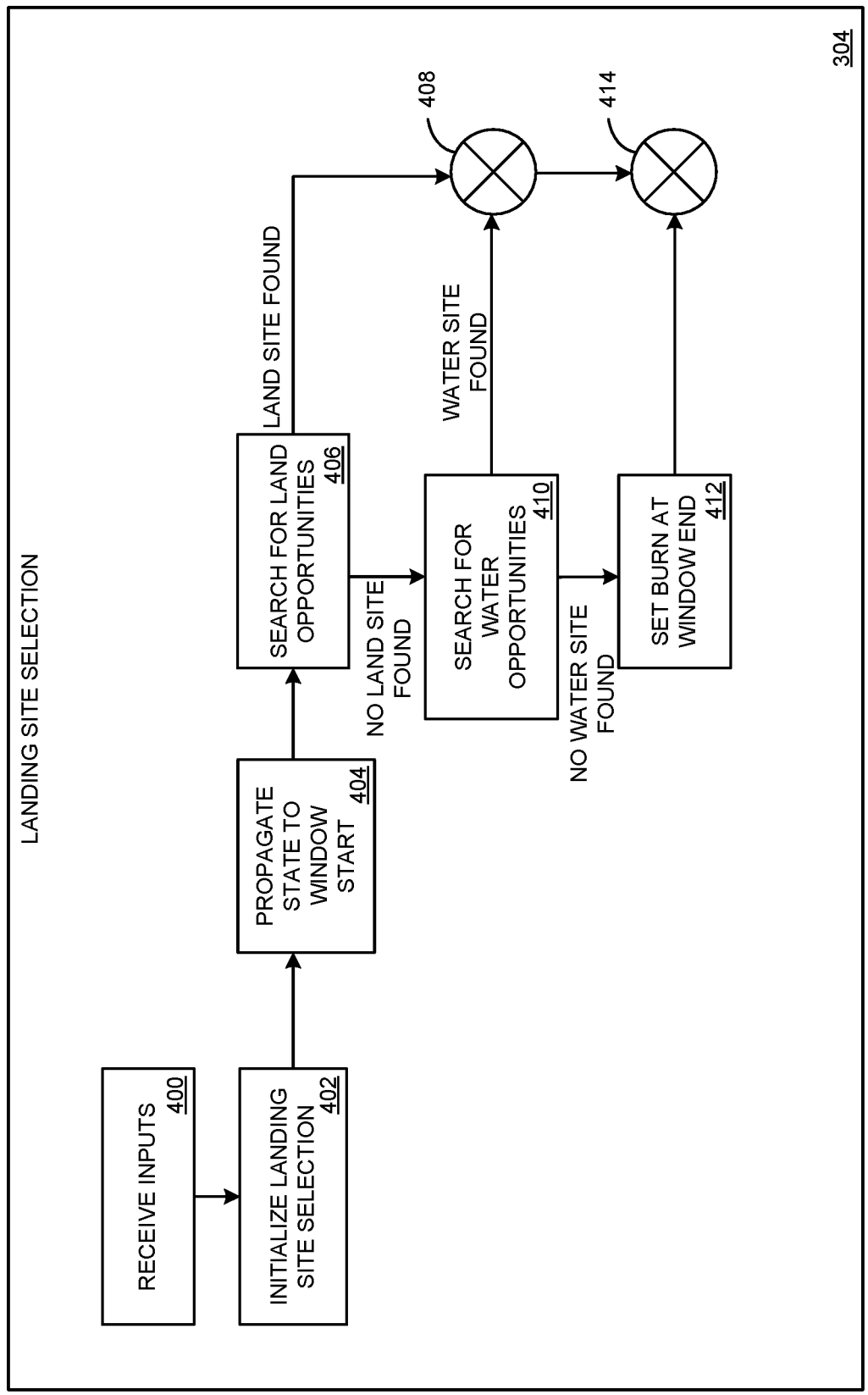
FIG. 4A illustrates a flowchart of a method for land site selection for deorbiting a spacecraft, according to an example implementation.

Turning back to block 304 of the method 300, FIG. 4A illustrates a flowchart of a method for land site selection for deorbiting the spacecraft 202, according to an example implementation. At block 400, functions include receiving inputs. The inputs can include sensor data indicative of a location of the spacecraft 202, the orbit state 204 of the spacecraft 202, and an altitude of the spacecraft 202. For example, this sensor data may be obtained by one or more of the avionic devices 112 during block 302 of the method 300. The received inputs may also include a time window associated with deorbiting the spacecraft 202 and a type of propulsion system corresponding to the propulsion system 124. The time window and the type of propulsion system may be received by way of the user interface 110 during block 306 of the method 300.

At block 402, functions include initializing the landing site selection. For example, this may include determining a duration of the time window received as an input and determining whether the received sensor data falls within predetermined constraints, such as a threshold speed, a threshold angle relative to the atmosphere 210, a threshold altitude or the like. For example, selection of a narrow time window while the spacecraft is traveling away from the atmosphere may cause the computing device 102 to provide an error message via the user interface 110 to alert a user that the selection is invalid or infeasible. The functions of block 402 may further include extracting, information from the received inputs for purposes of selecting a target landing site. For example, the functions may include determining a speed of the spacecraft 202 relative to a ground surface of the celestial body 216.

At block 404, functions include using propagating a state of the spacecraft 202 to the start of the selected time window. For example, the time window may start an hour from a time of selection and end two hours after the time of selection. Propagating the state of the spacecraft 202 to the start of the selected time window may involve, based on a trajectory of the spacecraft, an altitude of the spacecraft, and an altitude of an entry interface of the atmosphere 210, predicting a location of the spacecraft 202 one hour after the selection time based on a current trajectory of the spacecraft 202 and a known rotation of the celestial body 216. In this manner, the spacecraft 202 may reach a landing site at the earliest opportunity. In the example scenario presented in FIG. 2, the propagated state of the spacecraft 202 may correspond to the atmospheric entry location 208.

At block 406, functions include searching for land opportunities. In particular, this involves determining whether any known ground locations are reachable from the propagated state, or from any propagated state within the time window. Thus, searching for land opportunities may include, determining a region of the celestial body 216 that is reachable when the spacecraft 202 enters the atmosphere 210 within the time window, retrieving known ground locations from the database 128 and determining which, if any, of the known ground locations fall within the region of the celestial body 216. Determining a region of the celestial body 216 that is reachable when the spacecraft 202 enters the atmosphere 210 within the time window may include determining a range of possible entry locations based on the current trajectory of the spacecraft 202, a start time of the time window, an end time of the time window, and a known rotation of the celestial body 216, and determining the region of the celestial body 216 that is reachable from the range of possible entry locations. The functions may further include determining which of the ground locations that fall within the region provides the closest approach to the spacecraft 202, and determining whether the closest approach includes an acceptable cross-range distance. The cross-range distance can be a lateral distance from the downrange orbit of the spacecraft 202. An acceptable cross-range distance may be a threshold distance, such as 200 km from the downrange path of the spacecraft 202. More details of searching for land opportunities are provided below.

If a land site is found that corresponds to the time window, the functions proceed through a function state 408 to a function state 414 such that functions related to block 304 end and block 308 begins. If no land site is found then the functions of block 410 are carried out.

At block 410, functions include searching for water opportunities. For example, if no land opportunities are determined at block 406, a search for water opportunities may be carried out. This may involve retrieving, predetermined polygons on a water surface from a database 128. The predetermined polygons may be locations on bodies of water that have been deemed suitable for emergency landing scenarios. Thus, searching for water opportunities may include determining a region of the celestial body 216 that is reachable when the spacecraft 202 enters the atmosphere 210 within the time window, retrieving the predetermined polygons on the water surface from the database 128, and determining whether any portion of any of the predetermined polygons on the water surface fall within the region of the celestial body 216. Determining a region of the celestial body 216 that is reachable when the spacecraft 202 enters the atmosphere 210 within the time window may be performed substantially as described above with respect to block 406. The functions may further include determining which of these predetermined polygons that fall within the region provides the closest approach to the spacecraft 202, and determining whether the closest approach includes an acceptable cross-range distance. More details of searching for water opportunities are provided below.

If a water site is found that corresponds to the time window, the functions proceed through the function state 408 to the function state 414 such that functions related to block 304 end and block 308 begins. If no water site is found then the functions of block 412 are carried out.

At block 412, functions include setting a burn pulse at the end of the time window. Functions further include determining a landing site that corresponds to the end of the time window and that is within the capabilities of the spacecraft 202 in view of the type of propulsion system and using the end of the time window as the ignition time for the burn pulse. The functions also include proceeding to the function state 414 such that block 308 begins.

Figure 4B:
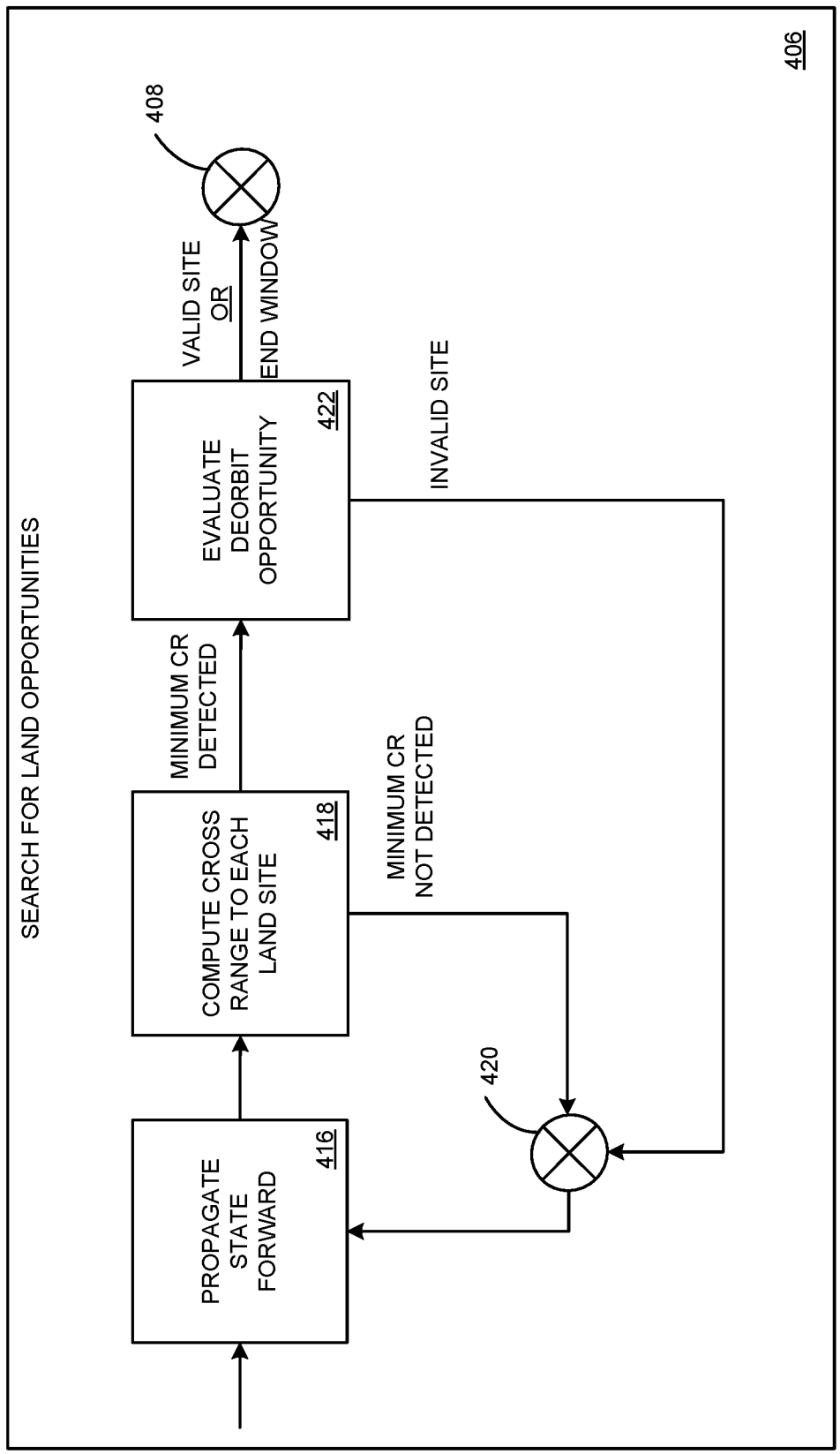
FIG. 4B illustrates a flowchart of a method for use with the method shown in FIG. 4A, according to an example implementation.

FIG. 4B illustrates a flowchart of another method for use with the method shown in FIG. 4A, according to an example implementation. In particular, FIG. 4B shows further details of selecting a land site in accordance with block 406. At block 416, functions include propagating a state of the spacecraft 202 forward to a next time step. Each time step may be an increment of the time window. For example, where the time window starts one hour after the selection time and ends two hours after the selection time, each time step may add another five minutes between the start time (1 hour after the selection time) and the end time (2 hours after the selection time). In this manner, performing block 406 may allow the spacecraft 202 to perform a burn pulse at substantially the earliest available time within the time window. Propagating the state forward may be determined, for example, from an expected atmospheric entry point, and may include determining a region on the celestial body 216 that is reachable from the propagated state of the spacecraft. Functions may further include whether any ground locations fall within the region.

At block 418, functions include computing the cross-range to each ground location (e.g. land site) that falls within the region determined at block 416. Determining the cross-range (CR) for each location may include determining a lateral distance from a downrange orbit of the spacecraft 202 for each ground location that falls within the region. If an acceptable cross-range is detected (i.e. a cross-range at or below a threshold cross-range, such as 200 km) for one or more of the ground locations, a minimum CR is detected, and block 418 proceeds to block 422. If no ground locations fall within the region or no ground locations correspond to the minimum cross-range, the minimum CR is not detected, and block 418 progresses to a function state 420.

At block 422, functions include evaluating one or more deorbit opportunities determined at blocks 416 and 418. This involves checking conditions against vehicle constraints, such as the capabilities of the propulsion system 124, estimating a target ignition time of the burn pulse, and confirming that the deorbit opportunity is valid, such as by confirming that the corresponding ground location can allow the spacecraft 202 to land at an expected landing time. If the deorbit opportunity is valid or if the propagated state has progressed to the end of the time window without finding a valid site, block 422 proceeds to the function state 408. If the deorbit opportunity is not valid and the propagated state has not progressed to the end of the time window, block 422 proceeds to the function state 420. Upon receiving a signal corresponding to block 418 or 422 not having detected a valid deorbit opportunity, the function state 420 iterates the process back to block 416, which increments the propagation state of the spacecraft 202 to the next time step. By iterating through the time window in this manner, the process can prioritize ground locations that are closer to the start of the time window for purposes of deorbiting. If no land site is found after iterating through one or more ground locations, block 406 can progress to block 410 such that block 410 is performed either concurrently with or after completion of block 406 as depicted in FIG. 4A.

Figure 4C:
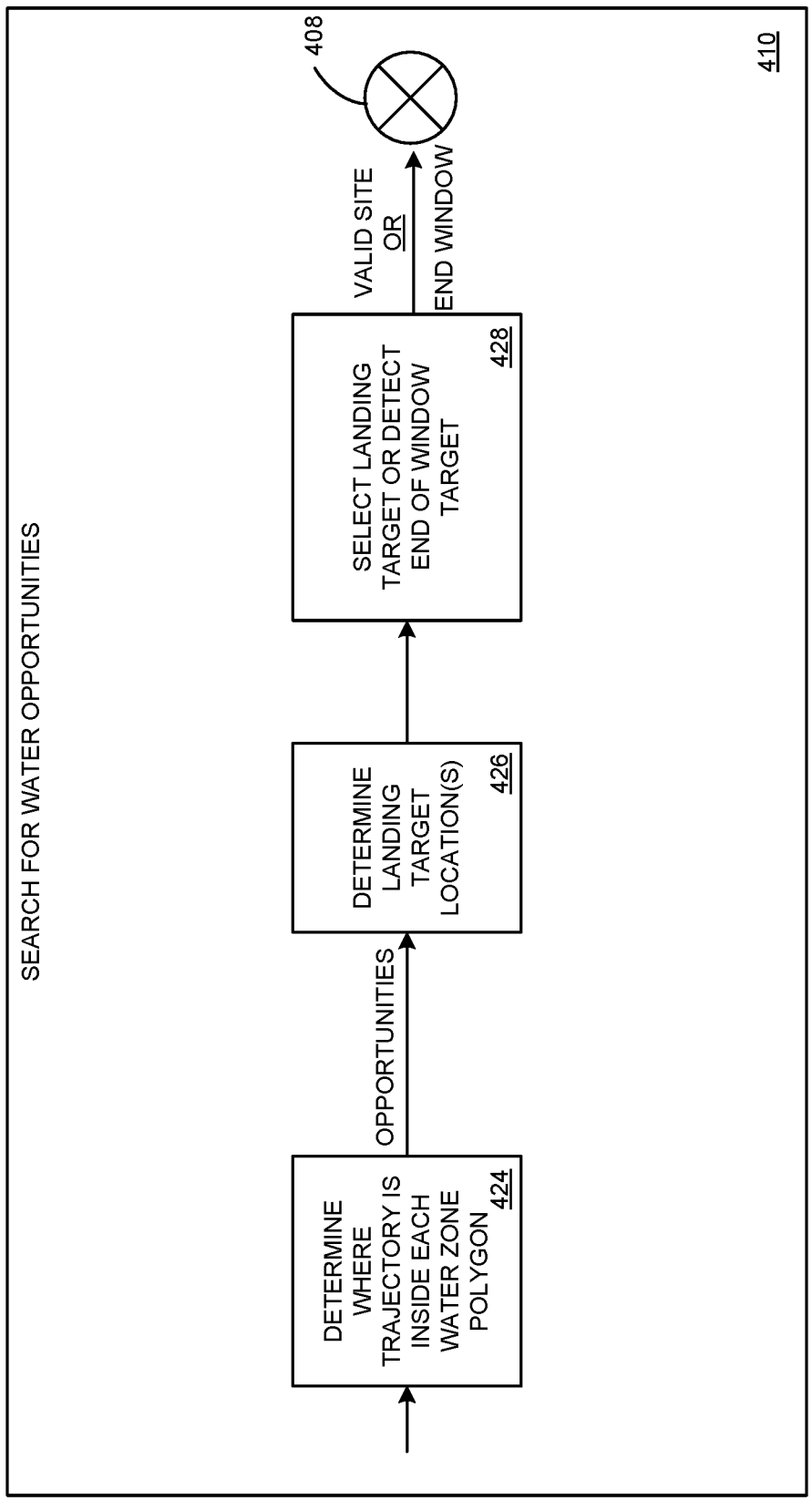
FIG. 4C illustrates a flowchart of a method for use with the method shown in FIG. 4A, according to an example implementation.

FIG. 4C illustrates a flowchart of another method for use with the method shown in FIG. 4A, according to an example implementation. In particular, FIG. 4C shows further details of selecting a water site in accordance with block 410. At block 424, functions include determining where the trajectory of the spacecraft falls (e.g. one or more opportunities) within each reachable polygon on the water surface, otherwise referred to herein as water zone polygons. This may involve determining, for each possible trajectory of the spacecraft 202 that falls within a water zone polygon, a start point and an end point that fall on boundaries of the water zone polygon.

At block 426, functions include, for each water zone polygon, determining one or more landing targets (e.g. one or more locations associated with particular water landing opportunities) based on where the spacecraft 202 crosses the polygon boundaries. This may include determining whether the start point or the end point should be selected as the landing target, and using either or both of the start point and end point as a landing target. The landing target can be referred to as a "water site."

Figure 5A:
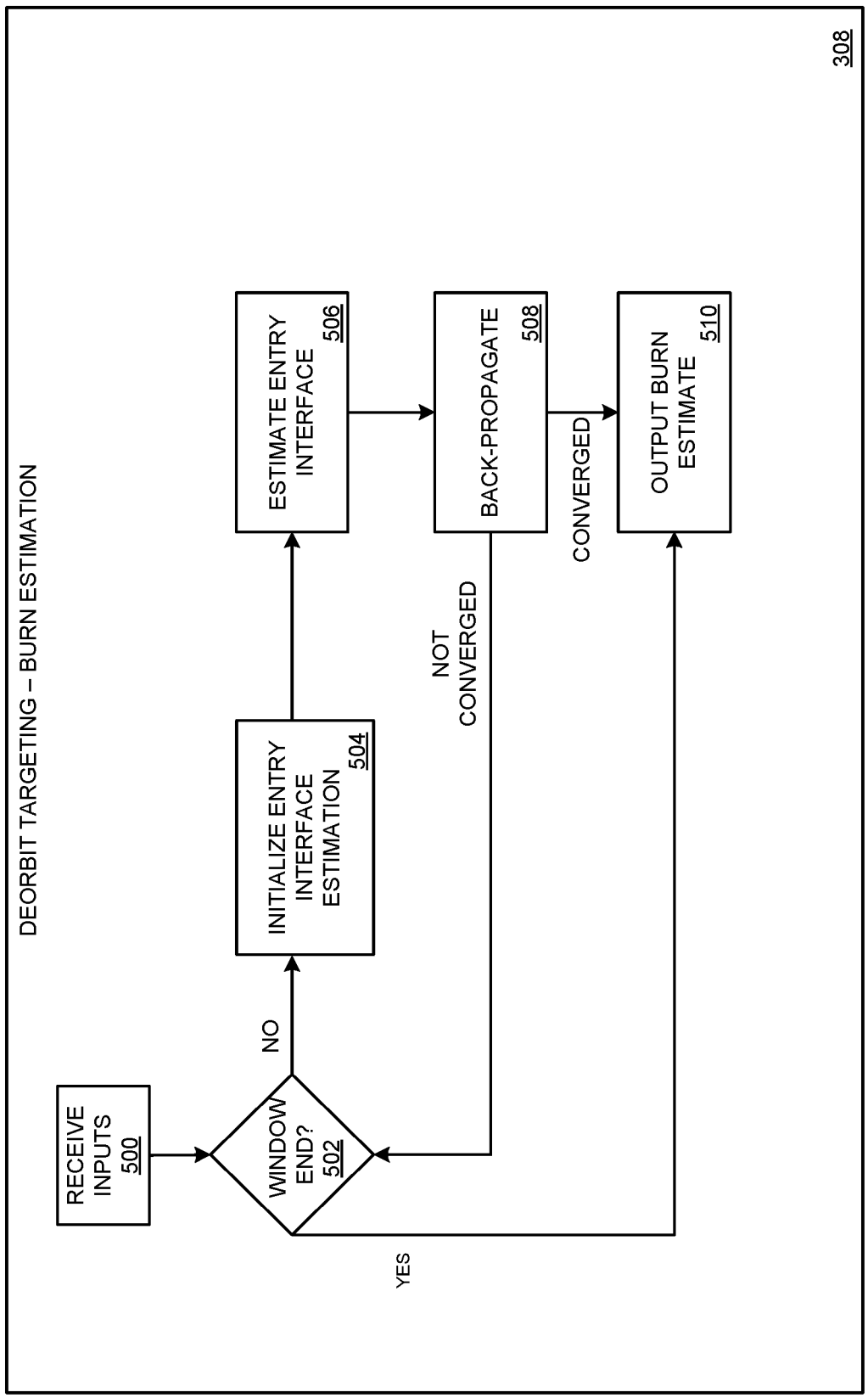
FIG. 5A illustrates a flowchart of a method for deorbit targeting for deorbiting a spacecraft, according to an example implementation.

At block 428, functions include evaluating the one or more landing targets determined at block 426, to select a landing target or detect the end of the target window. This involves checking conditions against vehicle constraints, such as the capabilities of the propulsion system 124, estimating a target ignition time of the burn pulse, and confirming that the deorbit opportunity corresponding to the landing target is valid, such as by confirming that the corresponding water zone polygon can allow the spacecraft 202 to land at an expected landing time. If adeorbit opportunity is valid and a landing target is thereby selected, or if the propagated state has progressed to the end of the time window without finding a valid landing target, block 428 proceeds to the function state 408. If no deorbit opportunity is valid, no landing target is selected, and block 428 proceeds to block 412 as depicted in FIG. 4A FIG. 5A illustrates a flowchart of a method for deorbit targeting for deorbiting a spacecraft, according to an example implementation. In particular, FIG. 5A shows further details relating to block 308 of the method 300. At block 500, functions include receiving inputs. For example, the inputs may correspond to sensor data from block 302, a target landing site from block 304, and user input from block 306. At block 502, functions include determining whether a current time is after an end time of the selected time window determined in block 306. If the time window has not ended, block 502 progresses to block 504.

At block 504, functions include initializing an entry interface estimation task for the spacecraft 202. In particular, initializing the entry interface estimation task involves receiving landing site data associated with the target landing site 214. The landing site data may include coordinates of the target landing site 214. Based on the received landing site data, functions include estimating a range target that relates to an expected distance between the spacecraft 202 and a predicted atmospheric entry location, a velocity target that relates to an expected velocity of the spacecraft 202 when reaching the predicted atmospheric entry location, and a path-angle corresponding to a path of the spacecraft 202 taken to reach the predicted atmospheric entry location. For example, the path-angle may be determined relative to a line running tangential to atmosphere 210. The predicted atmospheric entry location corresponds to a point at which the spacecraft 202 interacts with an atmosphere 210 in order to reach the target landing site 214. For purposes of example, this point may be the same as the atmospheric entry location 208 depicted in FIG. 2.

Determining the target range, target velocity, and path-angle may be based on one or more target lines from the spacecraft 202 to the target landing site 214. For example, the target range, target velocity, and path-angle may generally follow the inertia of the spacecraft in view of gravitational forces of the celestial body 216. The landing site data and corresponding target lines may be defined in accordance with a three-dimensional (3D) reference frame, such as a topodetic or topocentric coordinate frame and a corresponding quarternion.

At block 506, functions include estimating the entry interface using the initial range target, velocity target, and path-angle in view of known aspects of the spacecraft 202 and the atmosphere 210. For example, the functions may include adjusting one or more of the range target, velocity target, and path-angle in view of forces to be experienced by the spacecraft 202 upon interacting with the atmosphere 210. In this manner, a path of the spacecraft 202 may be relatively close to optimal prior to back-propagating the orbit state and responsively adjusting the range target, velocity target, and path-angle.

At block 508, functions include back-propagating from a predicted atmospheric entry location corresponding to the range target and the velocity target and comparing the back-propagated orbit state estimate of the spacecraft 202 to a known orbit state of the spacecraft 202, such as a current orbit state of the spacecraft 202. For purposes of illustration, the current orbit state of the spacecraft 202 may be thought of as the orbit state 204 depicted in FIG. 2.

If the back-propagated orbit state does not intersect with the known orbit state (e.g., if a path of the back-propagated orbit state does not cross the path of the known orbit state) or if the paths differ by a threshold amount (e.g., the corresponding paths intersecting at an angle above a threshold angle, such as a 0.001 degree angle), then the back-propagated orbit state does not converge with the known orbit state, and the process may iterate from blocks 502 to 508 while adjusting one or more of the range target, the velocity target, and path-angle until back-propagated orbit state and the known orbit state converge such that they substantially match (e.g., having paths that align or intersect one another and form an angle below a threshold angle, such as a 0.001 degree angle). Adjusting one or more of the range target, the velocity target, and path-angle may involve adjusting these factors to correct for a difference between the back-propagated orbit state and the known orbit state, such as an angle between a path of the back-propagated orbit state and a path of the known orbit state. Once the back-propagated orbit state has converged with the known orbit state, block 508 may progress to block 510.

At block 510, functions include calculating a burn estimate for the spacecraft 202. In particular, the burn estimate may include an estimated time of ignition for the propulsion system 124 of the spacecraft 202 and an estimated burn velocity vector of the propulsion system 124 for performing a burn pulse. The estimated time of ignition and the estimated burn velocity vector may be configured to cause the spacecraft 202 to be propelled so as to match one or more of the converged range target, velocity target, and path-angle in view of known aspects of the spacecraft 202, such as a known thrust rating of the propulsion system 124, a mass of the spacecraft 202, and drag factors of the spacecraft. Accordingly, calculating the burn estimate for the spacecraft comprises at least determining an ignition time and burn velocity vector capable of matching the range target, velocity target, and path-angle in view of a current orbit state of the spacecraft 202 and known aspects of the spacecraft 202. The burn velocity vector may be increased or decreased in accordance with a relative change in trajectory of the spacecraft to achieve this matching. If, at block 502, the time window has ended, a burn estimate may be determined based on a closest back-propagated orbit state. Further, though not depicted in FIG. 5A, if a back-propagated orbit state is determined to converge with the known orbit state, blocks 502 to 508 may iterate to improve the burn estimate until the time window has ended. In this manner, the calculated burn pulse can be as accurate as possible and require less adjustment during deorbiting.

Figure 5B:
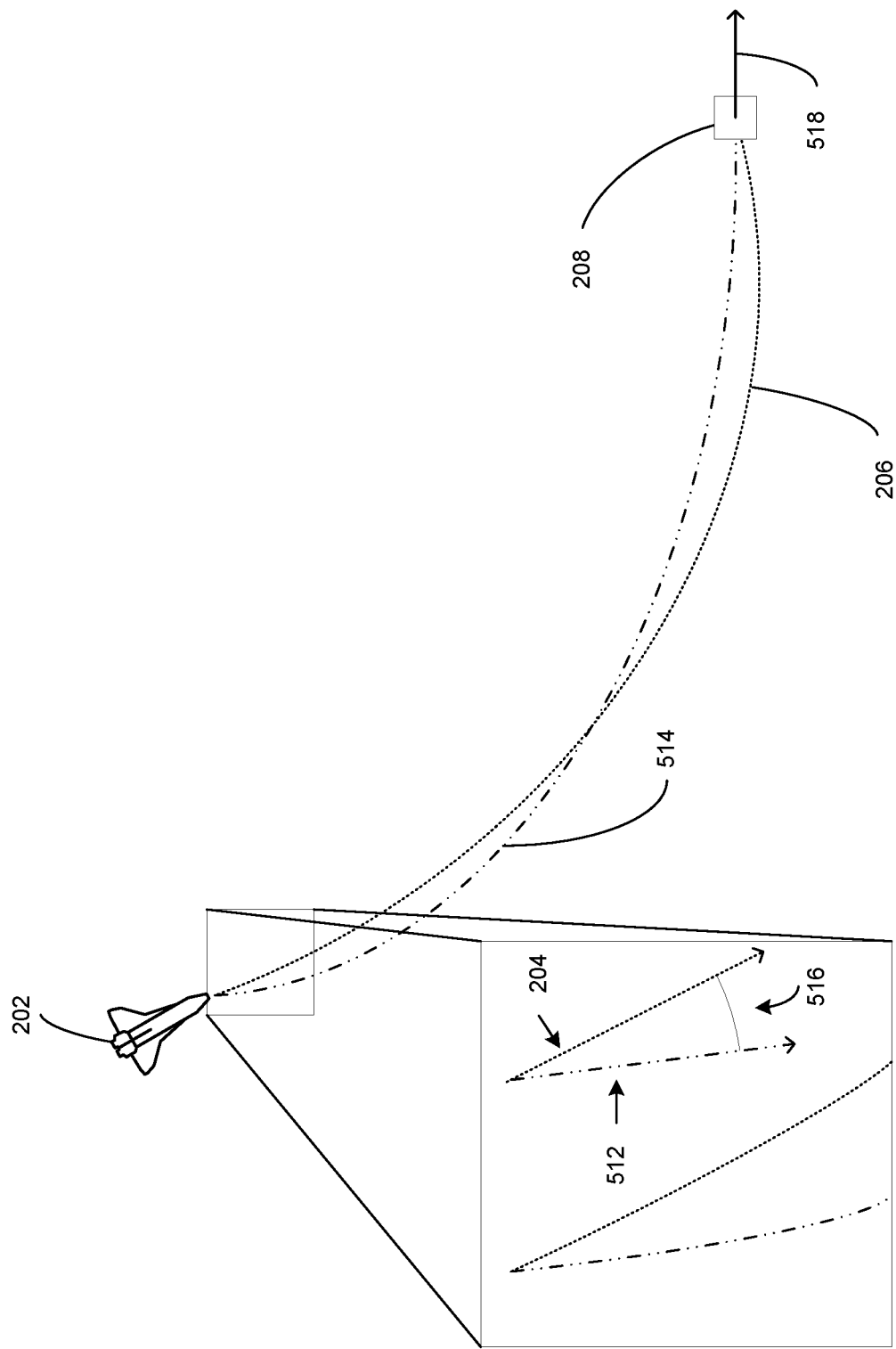
FIG. 5B illustrates an example of back-propagating an orbit state from a predicted atmospheric entry location, according to an example implementation.

FIG. 5B illustrates an example of back-propagating an orbit state from a predicted atmospheric entry location, according to an example implementation. More particularly, FIG. 5B illustrates a back-propagated orbit state estimate 512 that does not converge with the known orbit state.

For purposes of example, the back-propagated orbit state estimate 512 is a state that may be adjusted at block 506 in view of an interaction between the spacecraft 202 and the atmosphere 210. For example, a path 514 of the back-propagated orbit state estimate 512 is substantially co-linear with a tangent line 518 that runs tangentially to an entry interface of the atmosphere 210. Thus, the path 514 may skip on the entry interface rather than successfully deorbit.

The path 514 is representative of one or more of a range target, a velocity target, and a path-angle. The back-propagated orbit state estimate 512 is depicted as a trajectory that is tangential to the path 514 at a location of the spacecraft 202 at the known orbit state (depicted as the orbit state 204 for purposes of example). Though the back-propagated orbit state estimate 512 intersects with the known orbit state, an angle 516 formed between the path 514 and the path of the known orbit state (depicted as the first path 206) is greater than a threshold angle (e.g., 0.001 degrees). Accordingly, in the depicted example, the back-propagated orbit state estimate 512 does not converge with the known orbit state, and blocks 502-508 would continue to iterate. As such one or both of blocks 504 and 506 would adjust the target range, target velocity, or path-angle to achieve a converged back-propagated orbit state.

Figure 6A:
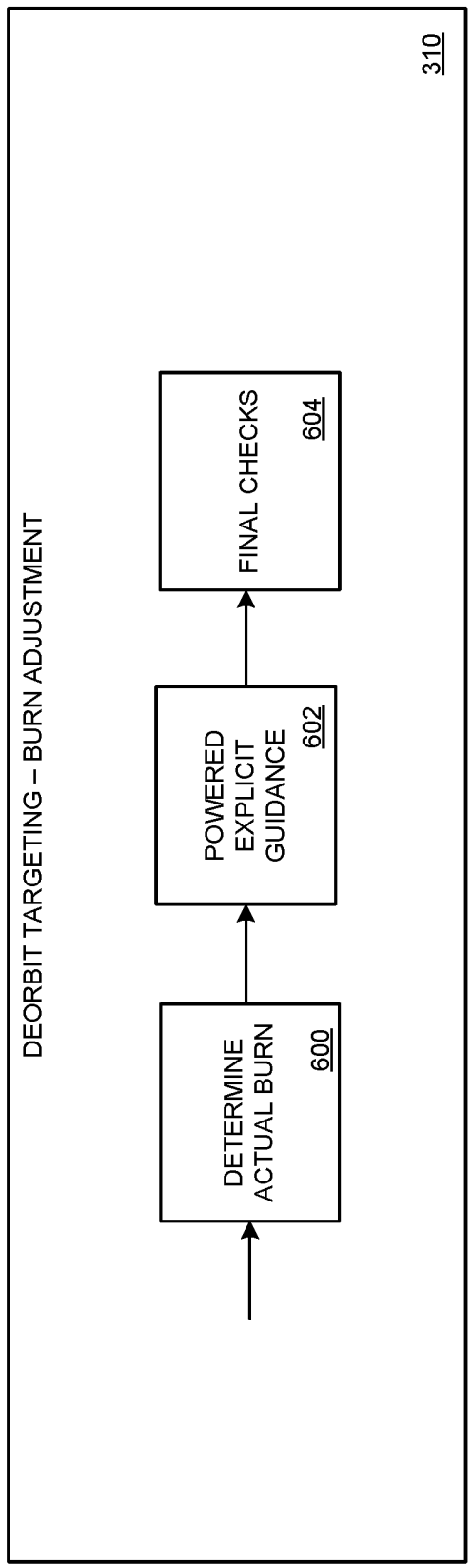
FIG. 6A illustrates a flowchart of a method for burn adjustment for deorbiting a spacecraft, according to an example implementation.

FIG. 6A illustrates a flowchart of a method for burn adjustment for deorbiting a spacecraft, according to an example implementation. In particular, FIG. 6A shows further details relating to block 310 of the method 300. At block 600, functions include determining an actual burn solution for deorbiting the spacecraft 202. These functions may include receiving the estimated time of ignition and estimated burn velocity vector determined at block 308 and determining the actual burn pulse by adjusting one or more of the estimated time of ignition and estimated burn velocity vector. Further, the functions may include receiving a current range from estimated atmospheric entry location, a current velocity, a current path-angle relative to the estimated atmospheric entry location, and an intercept and slope of a target line from a current location of the spacecraft 202 to the target landing site 214. Based on these inputs, functions include converging the actual burn solution use a convergence error loop for the path-angle, range, and velocity. Further details on how this is performed are provided below.

Within examples, rather than using the estimated atmospheric entry location described above with respect to FIG. 5A, functions may include using the convergence error loop may in accordance with a forward-propagated atmospheric interface, wherein the forward-propagated atmospheric interface corresponds to expected force characteristics to be experienced by the spacecraft when entering the atmosphere based on the estimated time of ignition, the estimated burn velocity vector, and the known orbit state of the spacecraft.

At block 602, functions include determining Powered Explicit Guidance (PEG) for the spacecraft 202 based on the determined actual burn solution. In particular, functions include receiving an actual time of ignition and an actual burn velocity vector associated with the actual burn solution, as well as, for example, n intercept and slope of a target line from a current location of the spacecraft 202 to the target landing site 214, a path-angle to the estimated atmospheric entry location, and a height above the entry interface of the atmosphere 210. Using these inputs, determining the PEG may include course adjustment and fine adjustments of the first path 206 and the second path 212 taken while deorbiting the spacecraft 202 in accordance with standard PEG protocol. These functions may be performed by the computing device 102 or a dedicated PEG controller of the spacecraft 202.

At block 604, functions include performing final checks on the actual burn solution in view of adjustments made by the PEG. For example, this may involve reasonableness checks for the determined solution and resulting path in view of predetermined rules, analyzing the actual burn solution using a machine learning model trained by past deorbits of the spacecraft 202 and/or other spacecraft, or simulating results of the actual burn solution and verifying that simulated forces fall within ratings of the spacecraft 202 and that the actual burn solution allows the spacecraft 202 to reach the target landing site 214. Within examples, the simulation may be carried out by the computing device 102 or a separate simulation system.

Within examples, the actual burn solution may be implemented as a burn pulse generated by one or more thrusters of the propulsion system 124 at the actual ignition time and in accordance with the actual burn velocity vector. Further, PEG course adjustments and final checks may be performed both before and after the actual ignition time of the burn pulse. Any course adjustments and fine adjustments performing during these steps may be implemented using the propulsion system 124, the stabilization system 126, or the combination thereof.

Figure 6B:
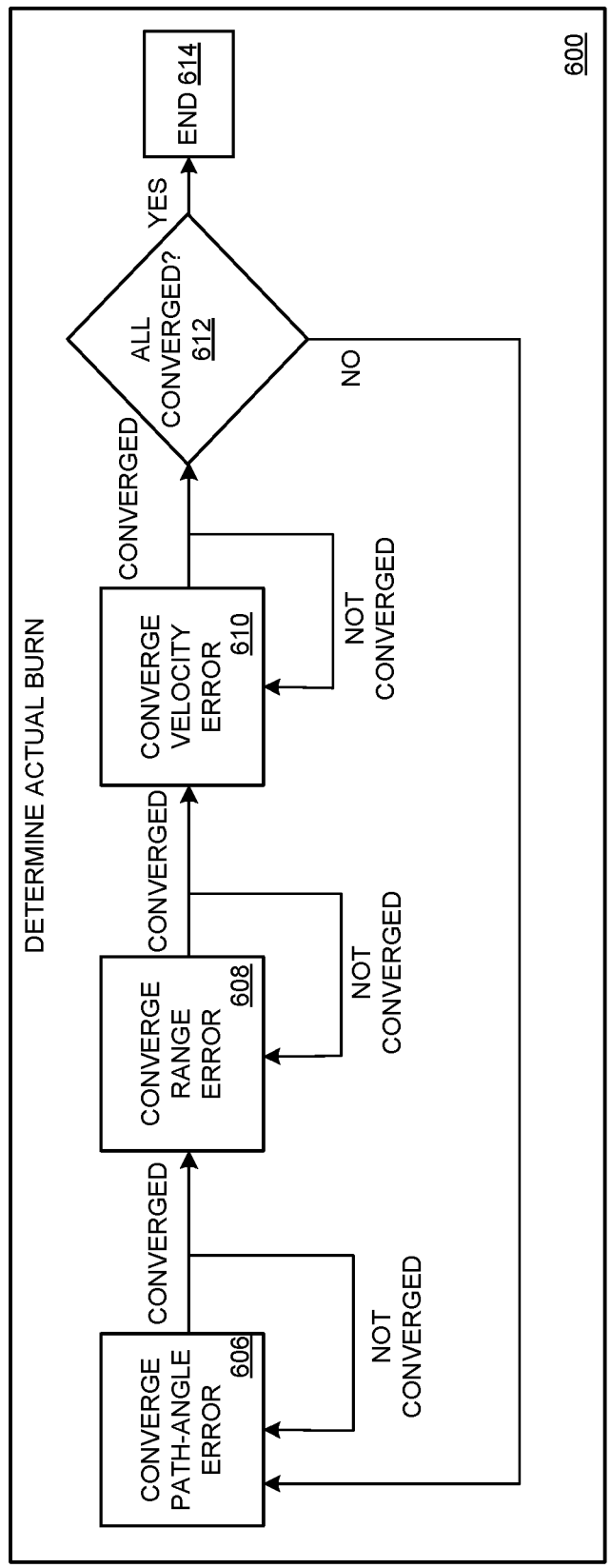
FIG. 6B illustrates a flowchart of a method for use with the method shown in FIG. 6A, according to an example implementation.

FIG. 6B illustrates a flowchart of a method for use with the method shown in FIG. 6A, according to an example implementation. In particular, FIG. 6B shows further details relating to block 600. More particularly, FIG. 6B shows an example convergence loop used to determine the actual burn solution described with respect to FIG. 6A. At block 606, functions include determining whether a path-angle error has converged towards zero. Once the path-angle error converges, block 606 progresses to block 608. While the path-angle error has not converged, block 606 repeats. For example, if the path-angle error is found to be above a threshold error rate, then block 606 iterates using updated values for one or more of the path-angle, range target, and velocity target associated with the actual burn solution. At block 608, functions include determining whether a range error has converged towards zero. Once the range error converges, block 608 progresses to block 610. While the range error has not converged, block 608 repeats. At block 610, functions include determining whether a velocity error has converged towards zero. While the velocity error has not converged, block 610 repeats. Once the velocity error converges, block 610 progresses to block 612. Convergence in this context may relate to minimizing the each respective error term to a value less than a threshold value, such as a 1 meter per second error. At block 612, functions include determining whether blocks 606, 608, and 610 have converged, and if so, ends the process at block 614. In this case, the final values for path-angle, range target, and velocity target can be used to generate the actual burn solution.

By contrast, if not all terms have converged as described with respect to block 610, block 612 progresses to block 606, and the convergence loop repeats. For example, the path-angle, range target, and velocity target used to calculate the estimated ignition time and the estimated burn velocity vector can be fed through the convergence loop to determine if their respective error terms are low enough to justify using that burn solution, and each iterative loop can improve these respective error terms while adjusting one or more of the path-angle, range target, and velocity target. Evaluating the error terms sequentially allows for more confidence as the loop progresses. For example, confidence that changes to the range target will achieve convergence is increased, because the path-angle term used to calculate the range target error has already been verified as falling below an error threshold.

At each of block 606, 608, and 610, a differential correction step may occur, in which changes to one or more of the path-angle, range target, and velocity target are weighted against a partial derivative matrix to determine the corresponding error term. These blocks may additionally or alternatively take the form of, for example, a cost function that uses as inputs one or more of the following: the current range from estimated atmospheric entry location, the current velocity, the current path-angle relative to the estimated atmospheric entry location, and the intercept and slope of the target line from a current location of the spacecraft 202 to the target landing site 214, and forces associated with interacting with the atmosphere. The cost function may determine an error score associated with one or more of the path-angle, range target, and velocity target. In such examples, a threshold error score may be used to determine convergence or lack thereof. Other ways to determine error terms are possible as well.

Figure 7:
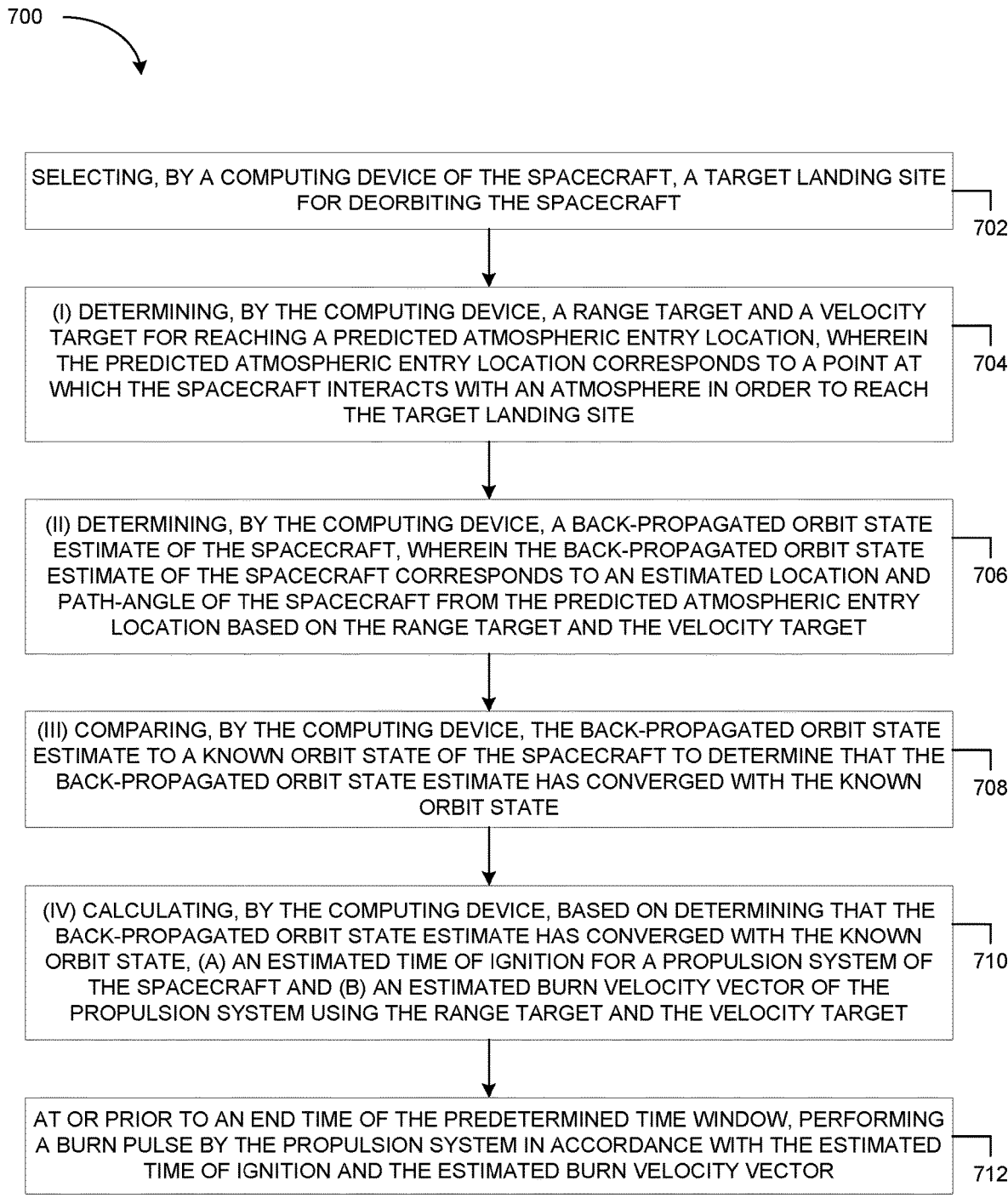
FIG. 7 illustrates a flowchart of a method for deorbiting a spacecraft, according to an example implementation.

FIG. 7 illustrates a flowchart of a method 700 for deorbiting a spacecraft, according to an example implementation. Method 700 shown in FIG. 7 presents an example of a method that could be used with the systems 100 and 200 shown in FIGS. 1 and 2, with components of systems 100 and/or 200, or in conjunction with a spacecraft, such as the spacecraft 202 shown in FIG. 2, for example. Further, the functions described with respect to FIG. 7 may be supplemented by, replaced by, or combined with functions from the method 300 described above with respect to FIGS. 3, 4A, 4B, 4C, 5A, 5B, 6A, and 6B. Further, devices or systems may be used or configured to perform logical functions presented in FIG. 7.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 700 may include one or more operations, functions, or actions as illustrated by one or more of blocks 702-712. Further, blocks 714-770 of the method 700 may be performed in accordance with one or more of block 702-712. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes selecting, by the computing device 102 of the spacecraft 202, a target landing site 214 for deorbiting the spacecraft. Selecting the target landing site 214 may be performed in accordance with FIGS. 3, 4A, 4B, and 4C, and their corresponding descriptions.

Within examples, the method may include receiving a predetermined time window associated with deorbiting the spacecraft 202. For example, the predetermined time window may be received by way of the user interface 110.

Blocks 704-710 may be performed during the predetermined time window associated with deorbiting the spacecraft 202:

At block 704, the method 700 includes determining, by the computing device 102, a range target and a velocity target for reaching a predicted atmospheric entry location, wherein the predicted atmospheric entry location corresponds to a point at which the spacecraft 202 interacts with the atmosphere 210 in order to reach the target landing site 214. Determining the range target and the velocity target may be performed in accordance with FIG. 3, FIG. 5A (particularly blocks 504 and 506), and their corresponding descriptions.

At block 706, the method 700 includes determining, by the computing device 102, a back-propagated orbit state estimate 512 of the spacecraft 202, wherein the back-propagated orbit state estimate 512 of the spacecraft 202 corresponds to an estimated location and path-angle of the spacecraft 202 from the predicted atmospheric entry location based on the range target and the velocity target. Determining the back-propagated orbit state estimate 512 of the spacecraft 202 may be performed in accordance with FIG. 3, FIG. 5A (particularly block 508), FIG. 5B, and their corresponding descriptions.

At block 708, the method 700 includes comparing, by the computing device 102, the back-propagated orbit state estimate 512 to a known orbit state of the spacecraft 202 to determine that the back-propagated orbit state estimate 512 has converged with the known orbit state. Within alternative examples, comparing the back-propagated orbit state estimate 512 to the known orbit state of the spacecraft 202 results in determining that the back-propagated orbit state estimate 512 has not converged with the known orbit state. In these examples, further range targets and velocity targets may be determined until a range target and velocity targets are determined by the computing device 102 that converge with the known orbit state of the spacecraft 202. Within examples, the known orbit state of the spacecraft may be a current orbit state of the spacecraft 202. Comparing the back-propagated orbit state estimate 512 to a known orbit state of the spacecraft 202 to determine that the back-propagated orbit state estimate 512 has converged with the known orbit state may be performed in accordance with FIG. 3, FIG. 5A (particularly block 508), FIG. 5B, and their corresponding descriptions.

At block 710, the method 700 includes calculating, by the computing device 102, based on determining that the back-propagated orbit state estimate has converged with the known orbit state, (a) an estimated time of ignition for a propulsion system of the spacecraft and (b) an estimated burn velocity vector of the propulsion system using the range target and the velocity target. Calculating the estimated time of ignition for a propulsion system of the spacecraft and the estimated burn velocity vector of the propulsion system may correspond to a burn pulse executed by the propulsion system 124, and may be performed in accordance with FIG. 3, FIG. 5A (particularly block 510), FIG. 5B, and their corresponding descriptions.

At block 712, the method 700 includes, at or prior to an end time of the predetermined time window, performing a burn pulse by the propulsion system 124 in accordance with the estimated time of ignition and the estimated burn velocity vector. Performing a burn pulse may be accomplished in accordance with FIG. 3, FIG. 6A, FIG. 6B, and their corresponding descriptions.

Figure 8:
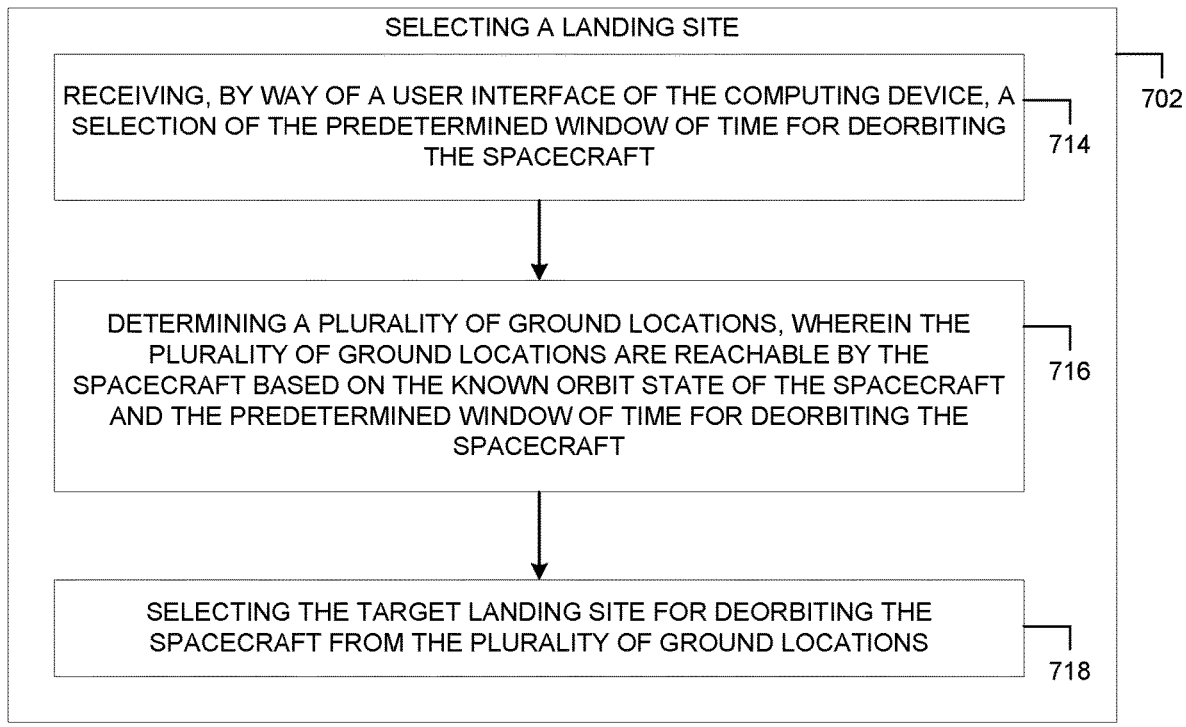
FIG. 8 illustrates a flowchart of a method for use with the method shown in FIG. 7, according to an example implementation.

FIG. 8 illustrates a flowchart of a method for use with the method 700 shown in FIG. 7, according to an example implementation. Blocks 714, 716, and 718 of the method 700 are performed in accordance with block 702. At block 714, the method 700 includes receiving, by way of the user interface 110 of the computing device 102, a selection of the predetermined time window for deorbiting the spacecraft. Within examples, selecting the time window may automatically trigger deorbiting functions of the computing device 102. At block 716, the method 700 includes determining a plurality of ground locations, wherein the plurality of ground locations are reachable by the spacecraft 202 based on the known orbit state of the spacecraft 202 and the predetermined time window for deorbiting the spacecraft. For example, the plurality of ground locations can be retrieved from the database 128. At block 718, the method 700 includes selecting the target landing site 214 for deorbiting the spacecraft 202 from the plurality of ground locations. Blocks 714, 716, and 718 may be performed in accordance with FIG. 3, FIG. 4A, FIG. 4B, and their corresponding descriptions.

Figure 9:
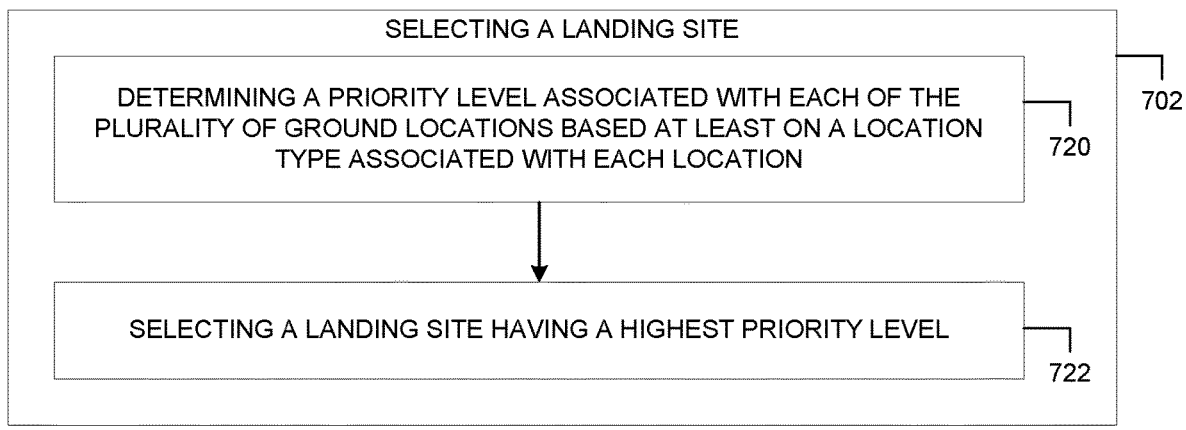
FIG. 9 illustrates a flowchart of a method for use with the method shown in FIG. 7, according to an example implementation.

FIG. 9 illustrates a flowchart of a method for use with the method 700 shown in FIG. 7, according to an example implementation. Blocks 720 and 722 of the method 700 are performed in accordance with block 702. At block 720, the method 700 includes determining a priority level associated with each of the plurality of ground locations based at least on a location type associated with each location. For example, a first ground location may have a first priority level based on the first ground location being in a first country and the second ground location may have a second priority level based on the second ground location being in a second country. The first priority may be higher than the second priority because the first ground location is associated with a home country of the spacecraft 202, for example. At block 722, the method 700 includes selecting a landing site having a highest priority level. In this manner, the functions may be carried out to prioritize landing sites based on context.

Figure 10:
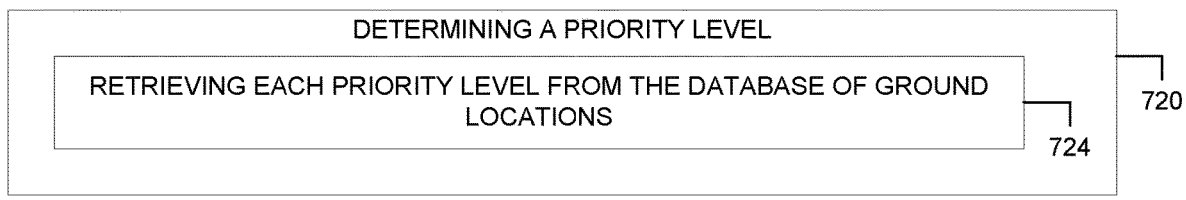
FIG. 10 illustrates a flowchart of a method for use with the method shown in FIG. 7 and FIG. 9, according to an example implementation.

FIG. 10 illustrates a flowchart of a method for use with the method 700 shown in FIG. 7 and FIG. 9, according to an example implementation. In particular, FIG. 10 illustrates an example wherein the spacecraft 202 comprises a database 128 of ground locations. Block 724 may be performed in accordance with block 720. At block 724, determining the priority level associated with each of the plurality of ground locations comprises retrieving each priority level from the database 128 of ground locations.

Figure 11:
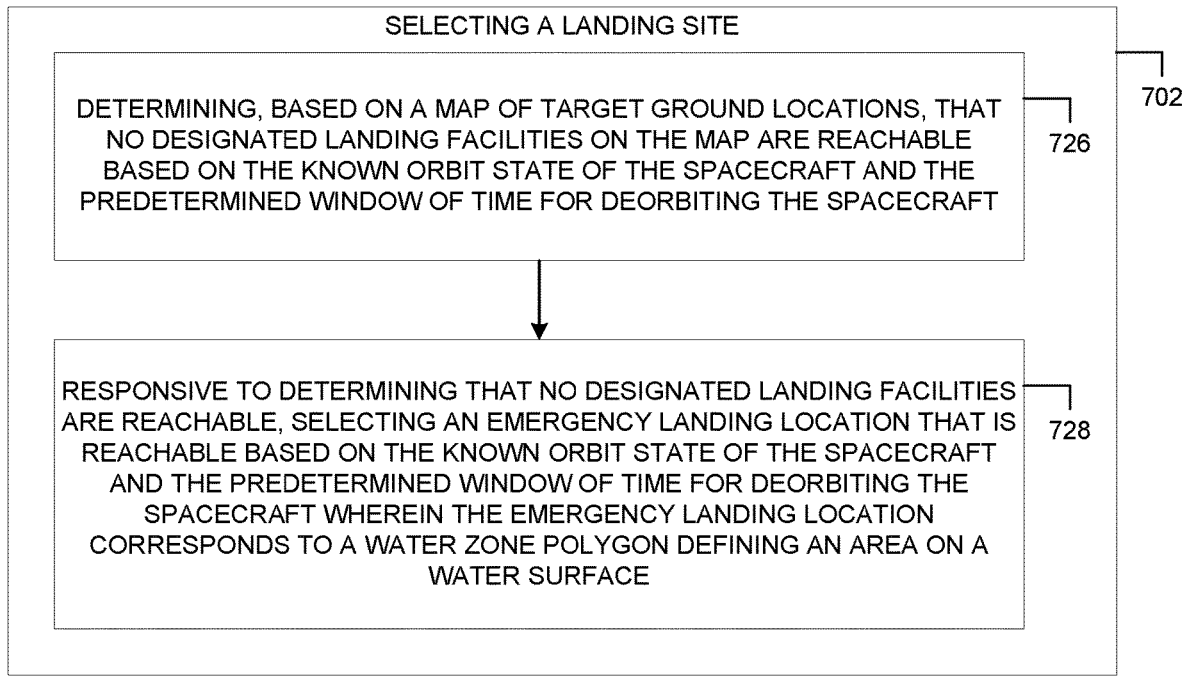
FIG. 11 illustrates a flowchart of a method for use with the method shown in FIG. 7, according to an example implementation.

FIG. 11 illustrates a flowchart of a method for use with the method 700 shown in FIG. 7, according to an example implementation. Blocks 726 and 728 are performed in accordance with block 702. At block 726, the method 700 includes determining, based on a map of target ground locations, that no designated landing facilities on the map are reachable based on the known orbit state of the spacecraft 202 and the predetermined window of time for deorbiting the spacecraft 202. In such examples, the map of designated landing facilities may be stored on the database 128. At block 728, the method 700 includes, responsive to determining that no designated landing facilities are reachable, selecting an emergency landing location that is reachable based on the known orbit state of the spacecraft 202 and the predetermined time window for deorbiting the spacecraft. For example, an emergency landing location may correspond to a water zone polygon, wherein the emergency landing location corresponds to a water zone polygon defining an area on a water surface. For example, as noted above, the area defined by a water zone polygon can define a viable emergency landing zone. Within examples, these landing zones can be classified by priority and/or safety ratings.

Blocks 726 and 728 may be performed in accordance with FIG. 3, FIG. 4A, FIG. 4C, and their corresponding descriptions.

Figure 12:
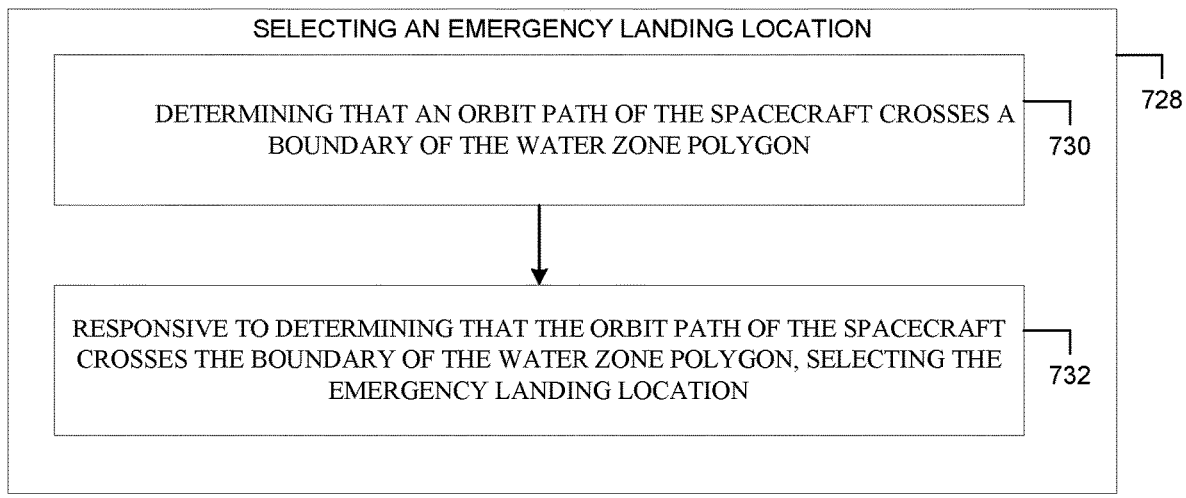
FIG. 12 illustrates a flowchart of a method for use with the method shown in FIG. 7 and FIG. 11, according to an example implementation.

FIG. 12 illustrates a flowchart of a method for use with the method 700 shown in FIG. 7 and FIG. 11, according to an example implementation. Blocks 730 and 732 are performed in accordance with block 728. At block 730, the method 700 further includes determining that an orbit path of the spacecraft crosses a boundary of the water zone polygon. Within examples, the orbit path may correspond to a projected path based on a current orbit state of the spacecraft 202 or an expected deorbit path of the spacecraft 202 given constraints including the time window and known characteristics of the atmosphere 210. At block 732, the method 700 further includes, responsive to determining that the orbit path of the spacecraft crosses the boundary of the water zone polygon, selecting the emergency landing location. In such examples, the emergency landing location may correspond to either a first location where the orbit path crosses the water zone polygon or a second location where the orbit path crosses the water zone polygon. Within still further examples, the emergency landing location may be a location within the water zone polygon, such as a point on the orbit path that crosses through the water zone polygon. In this manner, the spacecraft 202 may quickly determine a viable emergency landing location if no designated landing facilities are reachable within the time window.

Figure 13:
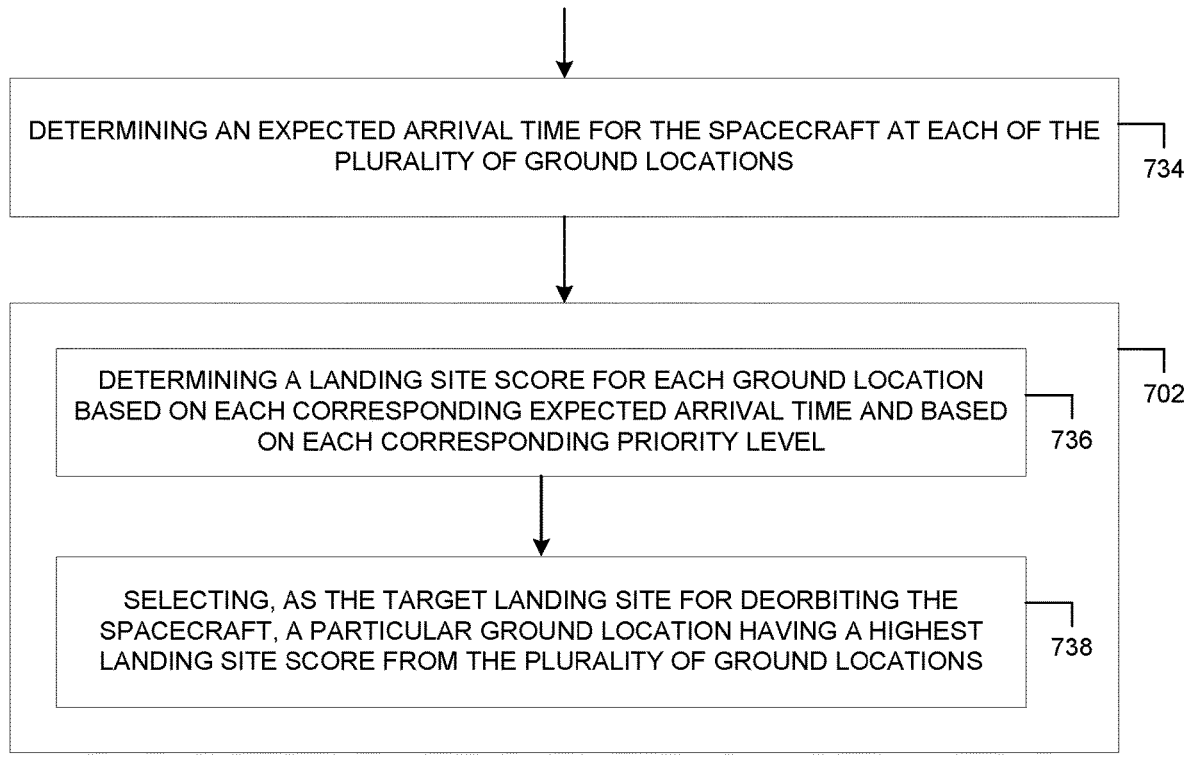
FIG. 13 illustrates a flowchart of a method for use with the method shown in FIG. 7, according to an example implementation.

FIG. 13 illustrates a flowchart of a method for use with the method 700 shown in FIG. 7, according to an example implementation. At block 734, the method 700 includes determining an expected arrival time for the spacecraft 202 at each of the plurality of ground locations. Blocks 736 and 738 are performed in accordance with block 702. At block 736, the method 700 includes determining a landing site score for each ground location based on each corresponding expected arrival time and based on each corresponding priority level. For example, landing site scores may be weighted based on expected arrival times and cross-ranges corresponding to each ground location. At block 738, the method 700 includes selecting, as the target landing site 214 for deorbiting the spacecraft 202, a particular ground location having a highest landing site score from the plurality of ground locations.

Figure 14:
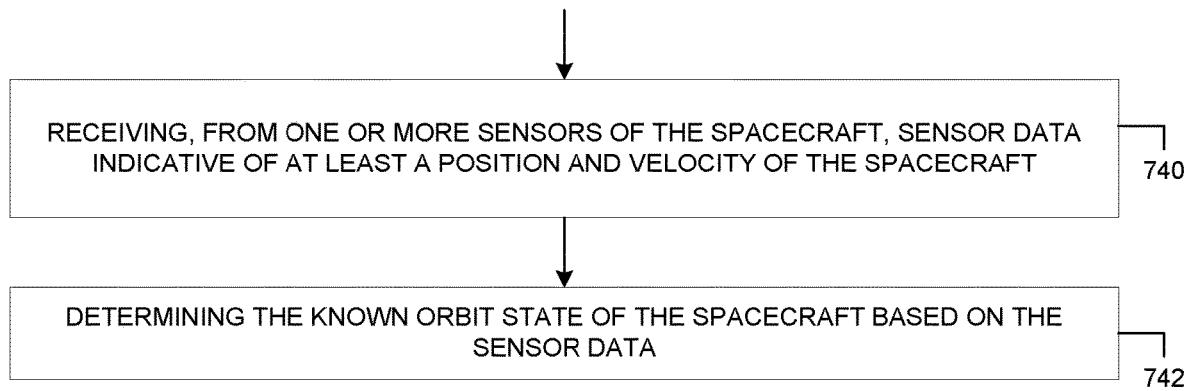
FIG. 14 illustrates a flowchart of a method for use with the methods shown in FIG. 7, according to an example implementation.

FIG. 14 illustrates a flowchart of a method for use with the method 700 shown in FIG. 7, according to an example implementation. In particular, blocks 740 and 742 may be performed prior to block 708, and, within examples, can be performed concurrently with one or more of blocks 702, 704, and 706. At block 740, the method 700 includes receiving, from one or more sensors of the spacecraft, sensor data indicative of at least a position and velocity of the spacecraft 202. For example, the one or more sensors may correspond to one or more of the avionic devices 112. At block 742, the method 700 includes determining the known orbit state of the spacecraft 202 based on the sensor data. Blocks 740 and 742 may be performed in accordance with FIG. 1, FIG. 3, and their corresponding descriptions.

Figure 15:
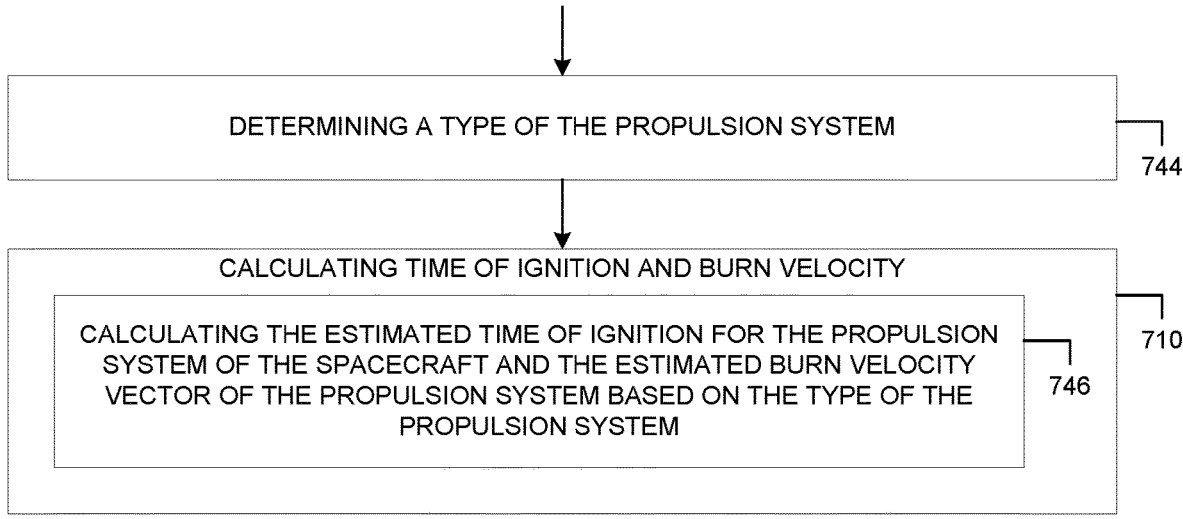
FIG. 15 illustrates a flowchart of a method for use with the method shown in FIG. 7, according to an example implementation.

FIG. 15 illustrates a flowchart of a method for use with the method 700 shown in FIG. 7, according to an example implementation. In particular, block 744 may be performed prior to block 710. For example, the spacecraft may receive an indication of a type of propulsion system via the user interface 110 when the deorbit targeting task is initiated, or the spacecraft may be associated with a particular type of propulsion system, and an indication of the type of propulsion system may be stored in the memory 106 prior to launch the spacecraft. At block 744, the method 700 includes determining a type of the propulsion system 124. Block 746 is performed in accordance with block 710. At block 746, the method 700 includes calculating the estimated time of ignition for the propulsion system 124 of the spacecraft 202 and the estimated burn velocity vector of the propulsion system based on the type of the propulsion system 124.

Figure 16:
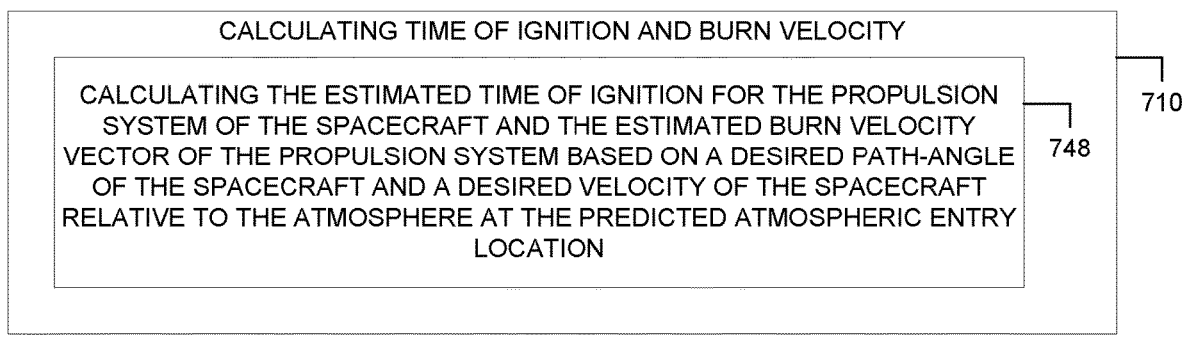
FIG. 16 illustrates a flowchart of a method for use with the method shown in FIG. 7, according to an example implementation.

FIG. 16 illustrates a flowchart of a method for use with the method 700 shown in FIG. 7, according to an example implementation. Block 748 is performed in accordance with block 710. At block 748, the method 700 includes calculating the estimated time of ignition for the propulsion system 124 of the spacecraft 202 and the estimated burn velocity vector of the propulsion system based on a desired path-angle of the spacecraft 202 and a desired velocity of the spacecraft relative to the atmosphere at the predicted atmospheric entry location. For example, the desired path-angle and the desired velocity may correspond to the path-angle and velocity target described above with respect to FIG. 3, FIG. 5A, and FIG. 5B.

Figure 17:
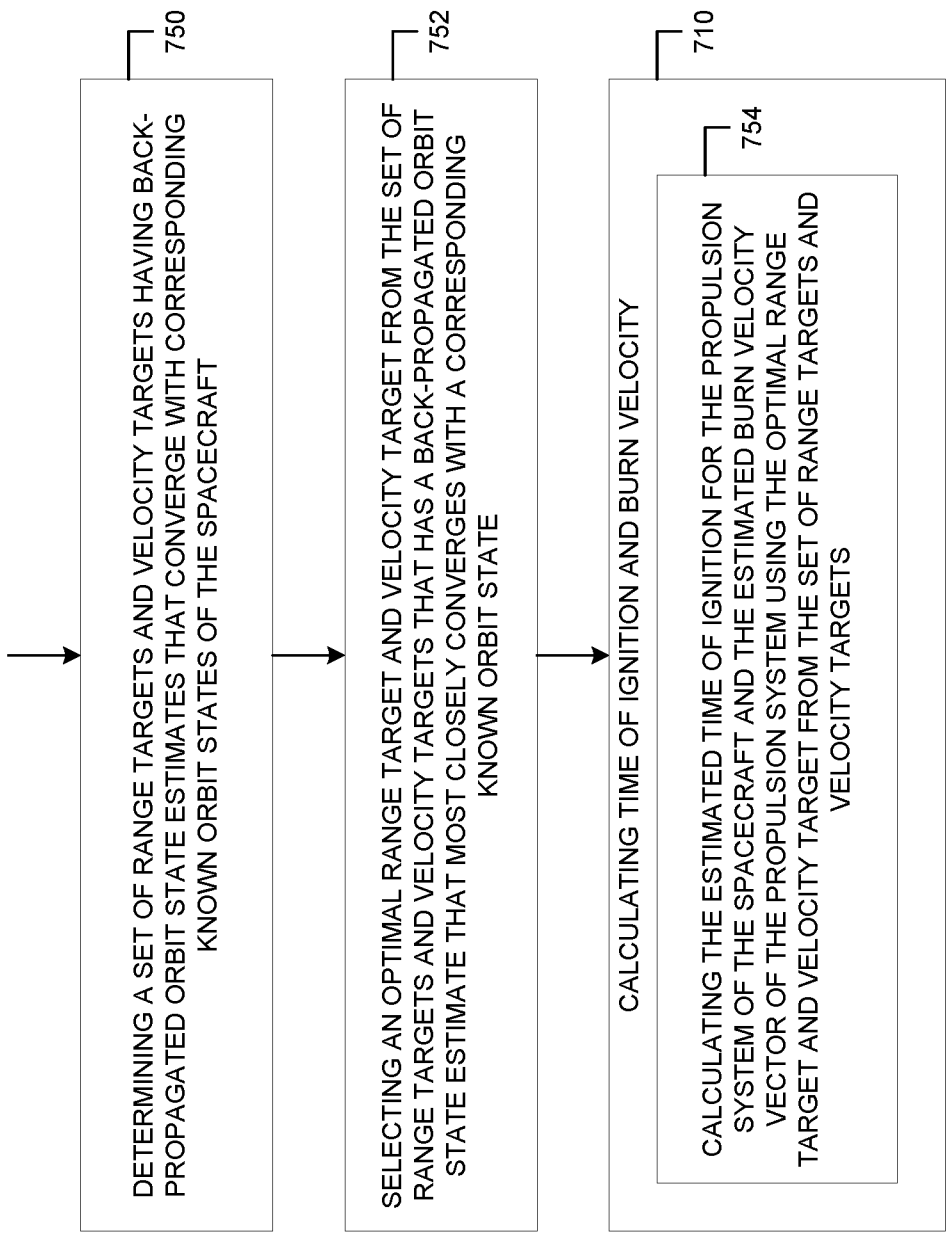
FIG. 17 illustrates a flowchart of a method for use with the method shown in FIG. 7, according to an example implementation.

FIG. 17 illustrates a flowchart of a method for use with the method 700 shown in FIG. 7, according to an example implementation. In particular, blocks 750 and 752 may be performed prior to block 710. Within examples, blocks 750 and 752 are performed concurrently with blocks 706 and 708. At block 750, the method 700 includes determining a set of range targets and velocity targets having back-propagated orbit state estimates that converge with corresponding known orbit states of the spacecraft. For example, the set of range targets and velocity targets may correspond to iterating through block 502-508 of the flow chart of block 308 depicted in FIG. 5A. At block 752, the method 700 includes selecting an optimal range target and velocity target from the set of range targets and velocity targets that has a back-propagated orbit state estimate that most closely converges with a corresponding known orbit state. In this context, the back-propagated orbit state estimate that most closely converges might be one that best aligns with a projected path of the spacecraft 202, or which has a trajectory having a lowest relative angle to a known trajectory of the spacecraft 202, in similar fashion to the angle 516 shown in FIG. 5B. Thus, block 752 is performed in accordance with FIG. 5A and FIG. 5B. Within examples, this may include iterating through blocks 502-508 until the time window ends and selecting the range target and velocity target that most closely converge to a known orbit state of the spacecraft 202. In this example, the range target and the velocity target correspond to the optimal range target and velocity target from the set of range targets and velocity targets. Block 754 is also performed in accordance with block 710. At block 754, the method 700 includes calculating the estimated time of ignition for the propulsion system 124 of the spacecraft 202 and the estimated burn velocity vector of the propulsion system 124 using the optimal range target and velocity target from the set of range targets and velocity targets.

Figure 18:
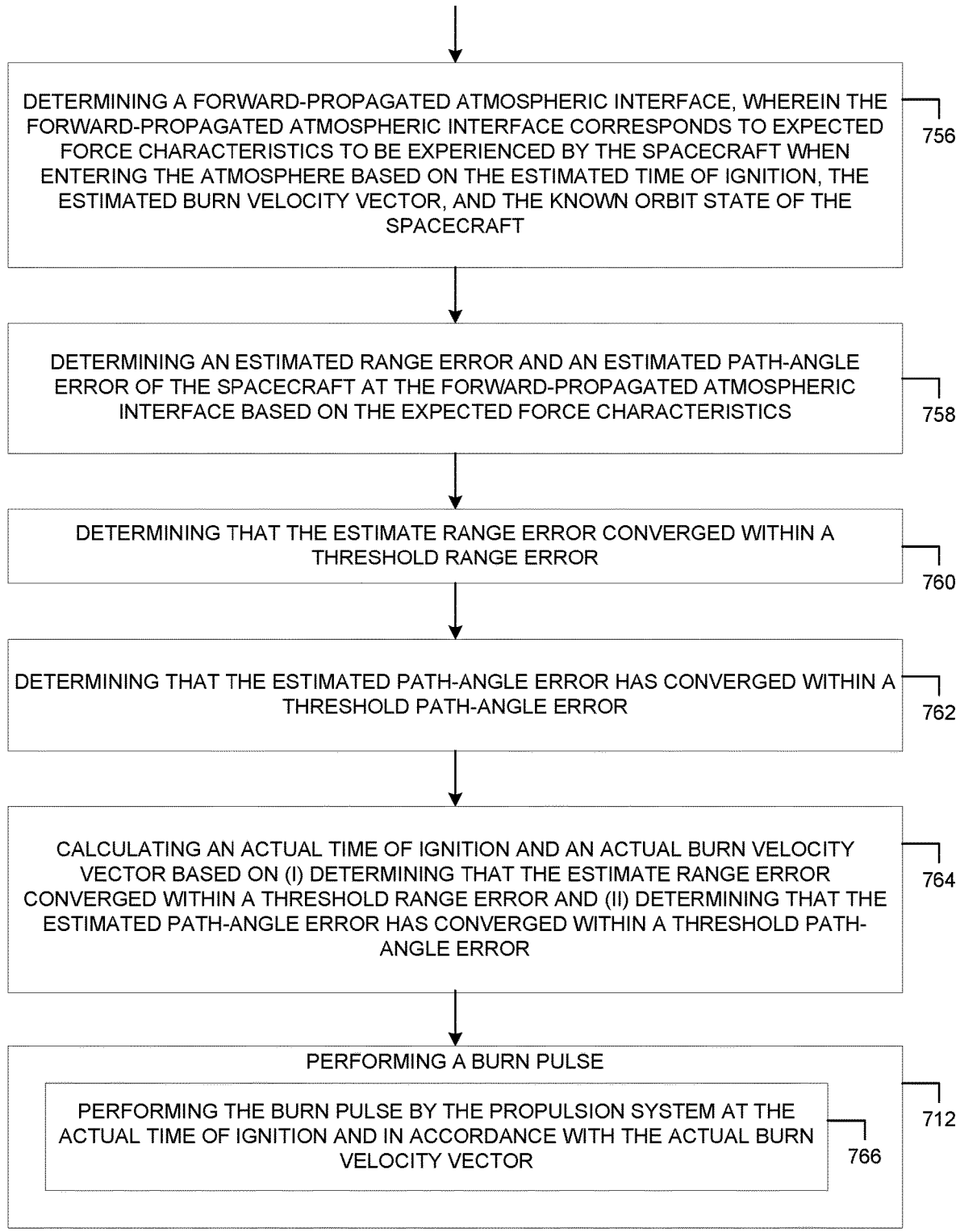
FIG. 18 illustrates a flowchart of a method for use with the methods shown in FIG. 7, according to an example implementation.

FIG. 18 illustrates a flowchart of a method for use with the methods shown in FIG. 7, according to an example implementation. In particular, blocks 756-764 may be performed prior to block 712. Further, within examples, blocks 756-764 may be performed after block 710. At block 756, the method 700 includes determining a forward-propagated atmospheric interface, wherein the forward-propagated atmospheric interface corresponds to expected force characteristics to be experienced by the spacecraft when entering the atmosphere based on the estimated time of ignition, the estimated burn velocity vector, and the known orbit state of the spacecraft 202. For example, the forward-propagated interface may correspond to the estimated atmospheric entry location described above with respect to FIG. 6A. At block 758, the method 700 includes determining an estimated range error and an estimated path-angle error of the spacecraft 202 at the forward-propagated atmospheric interface based on the expected force characteristics. For example, this may be implemented as part of the cost function described above with respect to FIG. 6B. At block 760, the method 700 further includes determining that the estimate range error converged within a threshold range error. At block 762, the method 700 further comprises determining that the estimated path-angle error has converged within a threshold path-angle error. At block 764, the method 700 includes calculating an actual time of ignition and an actual burn velocity vector based on (i) determining that the estimate range error converged within a threshold range error and (ii) determining that the estimated path-angle error has converged within a threshold path-angle error. Block 766 is performed in accordance with block 712. At block 766, the method 700 includes performing the burn pulse by the propulsion system at the actual time of ignition and in accordance with the actual burn velocity vector. Blocks 756-766 may be performed in accordance with FIG. 1, FIG. 3, FIG. 6A, FIG. 6B, FIG. 7, and their corresponding descriptions.

Figure 19:
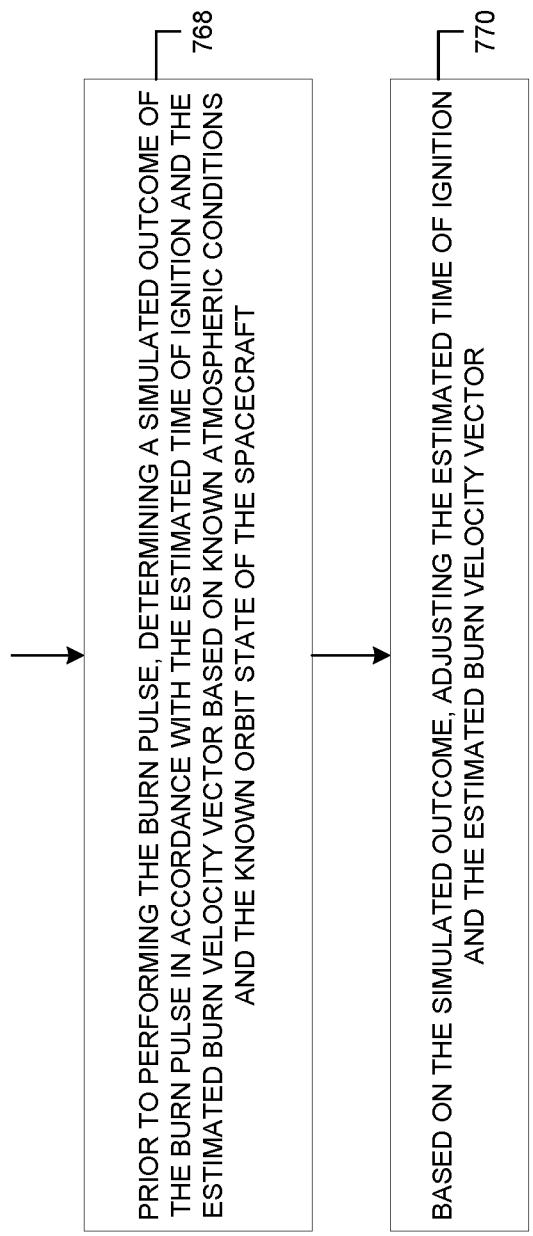
FIG. 19 illustrates a flowchart of a method for use with the method shown in FIG. 7, according to an example implementation.

FIG. 19 illustrates a flowchart of a method for use with the method 700 shown in FIG. 7, according to an example implementation. At block 768, the method 700 includes, prior to performing the burn pulse, determining a simulated outcome of the burn pulse in accordance with the estimated time of ignition and the estimated burn velocity vector based on known atmospheric conditions and the known orbit state of the spacecraft 202. At block 770, the method 700 includes, based on the simulated outcome, adjusting the estimated time of ignition and the estimated burn velocity vector. Blocks 768 and 770 may be performed in accordance with FIG. 1, FIG. 3, FIG. 6A, FIG. 6B, and their corresponding descriptions.

Thus, within examples, a robust and accurate on-board deorbiting system is described that is capable of carrying out functions described herein. By performing these functions on-board rather than by relying on communications to a ground system, the disclosed embodiments allow for back-propagated burn estimates that are vetted by known orbit states in real time or near real time, and carried out quickly. Thus, even in examples where a selected time window is narrow or an emergency landing is warranted, the deorbiting process can be implemented reliably and effectively, without latency and error associated with space-to-ground communications.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of deorbiting a spacecraft, comprising:
  receiving, by way of a user interface of a computing device, a selection of a predetermined time window for deorbiting the spacecraft;
  selecting, by the computing device, a target landing site based on a known orbit state of the spacecraft and the predetermined time window for deorbiting the spacecraft;
  during the predetermined time window:
    (i) determining, by the computing device, a range target and a velocity target for reaching a predicted atmospheric entry location, wherein the predicted atmospheric entry location corresponds to a point at which the spacecraft interacts with an atmosphere in order to reach the target landing site,
    (ii) determining, by the computing device, a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target,
    (iii) comparing, by the computing device, the back-propagated orbit state estimate to the known orbit state of the spacecraft to determine that the back-propagated orbit state estimate has converged with the known orbit state, and
    (iv) calculating, by the computing device, based on determining that the back-propagated orbit state estimate has converged with the known orbit state, (a) an estimated time of ignition for a propulsion system of the spacecraft and (b) an estimated burn velocity vector of the propulsion system using the range target and the velocity target; and
  at or prior to an end time of the predetermined time window, performing a burn pulse by the propulsion system in accordance with the estimated time of ignition and the estimated burn velocity vector.

2. The method of claim 1, wherein selecting the target landing site for deorbiting the spacecraft comprises determining a priority level associated with each of a plurality of ground locations based at least on a location type associated with each location; and
  selecting a landing site having a highest priority level.

3. The method of claim 2, wherein the spacecraft comprises a database of ground locations, and wherein determining the priority level associated with each of the plurality of ground locations comprises retrieving each priority level from the database of ground locations.

4. The method of claim 1, wherein selecting the target landing site for deorbiting the spacecraft comprises:
  determining, based on a map of target ground locations, that no designated landing facilities on the map are reachable based on the known orbit state of the spacecraft and the predetermined time window for deorbiting the spacecraft; and responsive to determining that no designated landing facilities are reachable, selecting an emergency landing location that is reachable based on the known orbit state of the spacecraft and the predetermined time window for deorbiting the spacecraft, wherein the emergency landing location corresponds to a water zone polygon defining an area on a water surface.

5. The method of claim 4, wherein selecting the emergency landing location comprises:

determining that an orbit path of the spacecraft crosses a boundary of the water zone polygon; and responsive to determining that the orbit path of the spacecraft crosses the boundary of the water zone polygon, selecting the emergency landing location.

6. The method of claim 1, further comprising:

determining an expected arrival time for the spacecraft at each of a plurality of ground locations, wherein selecting the target landing site for deorbiting the spacecraft from the plurality of ground locations comprises:

determining a landing site score for each ground location based on each corresponding expected arrival time and based on each corresponding priority level; and selecting, as the target landing site for deorbiting the spacecraft, a particular ground location having a highest landing site score from the plurality of ground locations.

7. The method of claim 1, further comprising:

receiving, from one or more sensors of the spacecraft, sensor data indicative of at least a position and velocity of the spacecraft; and determining the known orbit state of the spacecraft based on the sensor data.

8. The method of claim 1, further comprising determining a type of the propulsion system, wherein calculating the estimated time of ignition for the propulsion system of the spacecraft and the estimated burn velocity vector of the propulsion system comprises calculating the estimated time of ignition for the propulsion system of the spacecraft and the estimated burn velocity vector of the propulsion system based on the type of the propulsion system.

9. The method of claim 1, wherein calculating the estimated time of ignition for the propulsion system of the spacecraft and the estimated burn velocity vector of the propulsion system comprises calculating the estimated time of ignition for the propulsion system of the spacecraft and the estimated burn velocity vector of the propulsion system based on a desired path-angle of the spacecraft and a desired velocity of the spacecraft relative to the atmosphere at the predicted atmospheric entry location.

10. The method of claim 1, further comprising, during the predetermined time window associated with deorbiting the spacecraft:

determining a set of range targets and velocity targets having back-propagated orbit state estimates that converge with corresponding known orbit states of the spacecraft; and selecting an optimal range target and velocity target from the set of range targets and velocity targets that has a back-propagated orbit state estimate that most closely converges with a corresponding known orbit state, wherein the range target and the velocity target correspond to the optimal range target and velocity target from the set of range targets and velocity targets, and wherein calculating the estimated time of ignition for the propulsion system of the spacecraft and the estimated burn velocity vector of the propulsion system using the range target and the velocity target, comprises calculating the estimated time of ignition for the propulsion system of the spacecraft and the estimated burn velocity vector of the propulsion system using the optimal range target and velocity target from the set of range targets and velocity targets.

11. The method of claim 1, further comprising:

determining a forward-propagated atmospheric interface, wherein the forward-propagated atmospheric interface corresponds to expected force characteristics to be experienced by the spacecraft when entering the atmosphere based on the estimated time of ignition, the estimated burn velocity vector, and the known orbit state of the spacecraft;

determining an estimated range error and an estimated path-angle error of the spacecraft at the forward-propagated atmospheric interface based on the expected force characteristics;

determining that the estimate range error converged within a threshold range error;

determining that the estimated path-angle error has converged within a threshold path-angle error; and calculating an actual time of ignition and an actual burn velocity vector based on (i) determining that the estimate range error converged within a threshold range error and (ii) determining that the estimated path-angle error has converged within a threshold path-angle error, wherein performing the burn pulse by the propulsion system in accordance with the estimated time of ignition and the estimated burn velocity vector comprises performing the burn pulse by the propulsion system at the actual time of ignition and in accordance with the actual burn velocity vector.

12. The method of claim 1, further comprising:

prior to performing the burn pulse, determining a simulated outcome of the burn pulse in accordance with the estimated time of ignition and the estimated burn velocity vector based on known atmospheric conditions and the known orbit state of the spacecraft; and based on the simulated outcome, adjusting the estimated time of ignition and the estimated burn velocity vector.

13. A system for deorbiting a spacecraft comprising:

a spacecraft comprising:

a computing device having a processor and memory storing instructions executable by the processor to:

receive, by way of a user interface of the computing device, a selection of a predetermined time window for deorbiting the spacecraft;

select a target landing site based on a known orbit state of the spacecraft and the predetermined time window for deorbiting the spacecraft;

during the predetermined time window:

(i) determine a range target and a velocity target for reaching a predicted atmospheric entry location, wherein the predicted atmospheric entry location corresponds to a point at which the spacecraft interacts with an atmosphere in order to reach the target landing site, (ii) determine, a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target, (iii) compare the back-propagated orbit state estimate to the known orbit state of the spacecraft to determine that the back-propagated orbit state estimate has converged with the known orbit state, and (iv) calculate based on determining that the back-propagated orbit state estimate has converged with the known orbit state, (a) an estimated time of ignition for a propulsion system of the spacecraft and (b) an estimated burn velocity vector of the propulsion system using the range target and the velocity target; and cause the propulsion system to, at or prior to an end time of the predetermined time window, perform a burn pulse in accordance with the estimated time of ignition and the estimated burn velocity vector.

14. The system of claim 13, wherein the spacecraft further comprises:
a plurality of sensors,
wherein the instructions are further executable by the processor to receive, from one or more sensors of the spacecraft, sensor data indicative of at least a position and velocity of the spacecraft; and
determine the known orbit state of the spacecraft based on the sensor data.

15. The system of claim 13, wherein the spacecraft further comprises:
a database of propulsion system characteristics,
wherein the instructions are further executable by the processor to determine a type of the propulsion system, wherein calculating the estimated time of ignition for the propulsion system of the spacecraft and the estimated burn velocity vector of the propulsion system comprises, using the database of propulsion system characteristics, calculating the estimated time of ignition for the propulsion system of the spacecraft and the estimated burn velocity vector of the propulsion system based on the type of the propulsion system.

16. The system of claim 13, wherein the spacecraft further comprises:
a database of known atmospheric forces on the spacecraft associated with path-angles of the spacecraft and velocities of the spacecraft relative to the atmosphere,
wherein calculating the estimated time of ignition for the propulsion system of the spacecraft and the estimated burn velocity vector of the propulsion system comprises calculating the estimated time of ignition for the propulsion system of the spacecraft and the estimated burn velocity vector of the propulsion system based on a desired path-angle of the spacecraft and a desired velocity of the spacecraft relative to the atmosphere at the predicted atmospheric entry location.

17. The system of claim 13, wherein the spacecraft further comprises:
a simulation system for deorbiting the spacecraft,
wherein the instructions are further executable by the processor to:

prior to performing the burn pulse, determining a simulated outcome of the burn pulse in accordance with the estimated time of ignition and the estimated burn velocity vector based on known atmospheric conditions and the known orbit state of the spacecraft; and
based on the simulated outcome, adjusting the estimated time of ignition and the estimated burn velocity vector.

18. A non-transitory computer readable medium having stored thereon instructions, that when executed by one or more processors of a computing device, cause the computing device to perform functions comprising:
receiving, by way of a user interface of the computing device, a selection of a predetermined time window for deorbiting a spacecraft;
selecting a target landing site based on a known orbit state of the spacecraft and the predetermined time window for deorbiting the spacecraft;
during the predetermined time window:
(i) determining a range target and a velocity target for reaching a predicted atmospheric entry location, wherein the predicted atmospheric entry location corresponds to a point at which the spacecraft interacts with an atmosphere in order to reach the target landing site,
(ii) determining a back-propagated orbit state estimate of the spacecraft, wherein the back-propagated orbit state estimate of the spacecraft corresponds to an estimated location and path-angle of the spacecraft from the predicted atmospheric entry location based on the range target and the velocity target,
(iii) comparing the back-propagated orbit state estimate to the known orbit state of the spacecraft to determine that the back-propagated orbit state estimate has converged with the known orbit state, and
(iv) calculating based on determining that the back-propagated orbit state estimate has converged with the known orbit state, (a) an estimated time of ignition for a propulsion system of the spacecraft and (b) an estimated burn velocity vector of the propulsion system using the range target and the velocity target; and
at or prior to an end time of the predetermined time window, performing a burn pulse by the propulsion system in accordance with the estimated time of ignition and the estimated burn velocity vector.

19. The system of claim 13, the instructions further executable by the processor to:
receiving, from one or more sensors of the spacecraft, sensor data indicative of at least a position and velocity of the spacecraft; and
determining the known orbit state of the spacecraft based on the sensor data.

20. The non-transitory computer readable medium of claim 18, the functions further comprising:
receiving, from one or more sensors of the spacecraft, sensor data indicative of at least a position and velocity of the spacecraft; and
determining the known orbit state of the spacecraft based on the sensor data.

* * * * *